United States Patent [19]

McAlpine

[11] Patent Number: 4,837,785
[45] Date of Patent: Jun. 6, 1989

[54] DATA TRANSFER SYSTEM AND METHOD OF OPERATION THEREOF

[75] Inventor: Gary McAlpine, Portland, Oreg.

[73] Assignee: Aptec Computer Systems, Inc., Portland, Oreg.

[21] Appl. No.: 504,150

[22] Filed: Jun. 14, 1983

[51] Int. Cl.4 .............................................. H04J 3/02
[52] U.S. Cl. ..................................................... 370/85
[58] Field of Search ...................... 370/85, 86, 89, 93, 370/124, 94; 340/825.05, 825.06, 825.07

[56] References Cited

U.S. PATENT DOCUMENTS

| | | |
|---|---|---|
| 3,462,742 | 8/1969 | Miller et al. |
| 3,573,852 | 4/1971 | Watson et al. |
| 3,916,108 | 10/1975 | Schwartz .............................. 370/85 |
| 3,919,483 | 11/1975 | Gindi et al. .......................... 370/85 |
| 4,078,228 | 3/1978 | Miyazaki .............................. 370/86 |
| 4,115,850 | 9/1978 | Houston et al. |
| 4,128,882 | 12/1978 | Dennis . |
| 4,131,945 | 12/1978 | Richardson et al. |
| 4,156,932 | 5/1979 | Robinson et al. |
| 4,161,024 | 7/1979 | Joyce et al. |
| 4,172,281 | 10/1979 | Gordon . |
| 4,447,813 | 5/1984 | O'Pray ................................. 370/85 |

Primary Examiner—Robert L. Griffin
Assistant Examiner—Wellington Chin
Attorney, Agent, or Firm—William A. Birdwell

[57] ABSTRACT

A data transfer system with improved data transfer efficiency is provided. The system consists of a data interchange bus having two data transfer signal paths, an address signal path, and a plurality of control signal paths. Data interchange adapters and memory interchange adapters are coupled to the bus for transferring data thereover. A data interchange adapter transfers data on the first data signal path to another data interchange adapter or to a memory interchange adapter for storage in a memory device. A memory interchange adapter transfers data obtained from a memory device on the second data signal path to a data interchange adapter. Data transfers on the two data signal paths may be made simultaneously. Data transfers on both data signal paths are made synchronously. When an interchange adapter has data to be transferred, it provides an access request signal to a data interchange bus controller which intermittently latches all outstanding access requests, examines them, and produces a sequence of grant signals, each satisfying one of the latched request signals. When the sequence is completed, the controller again latches the access requests which had been raised during the prior latching and granting procedure. The data interchange adapter is further provided with the capability of coupling to two other data buses while coupled to the data interchange bus and includes interface and control circuitry for routing signals between any two of the three buses.

4 Claims, 10 Drawing Sheets

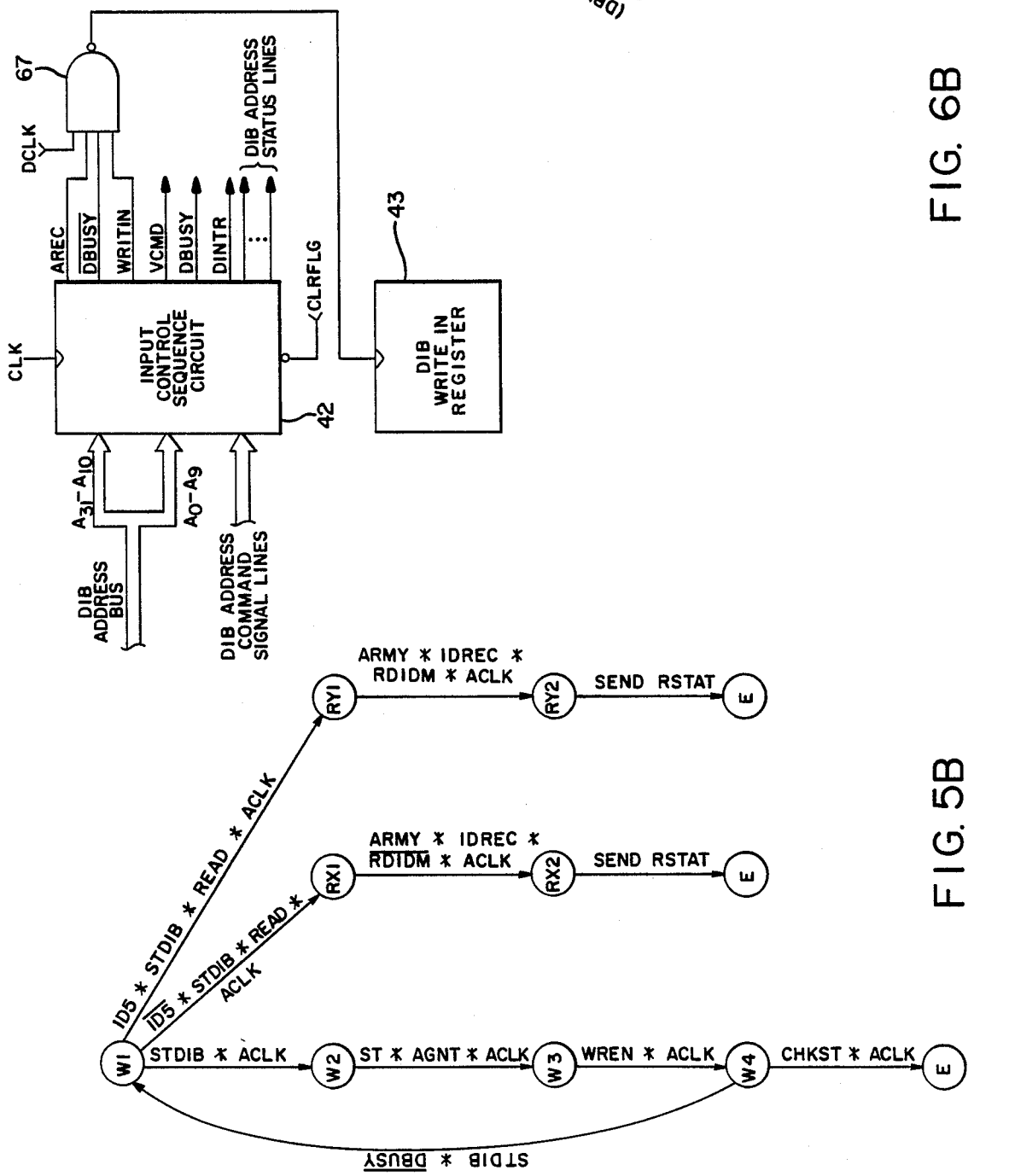

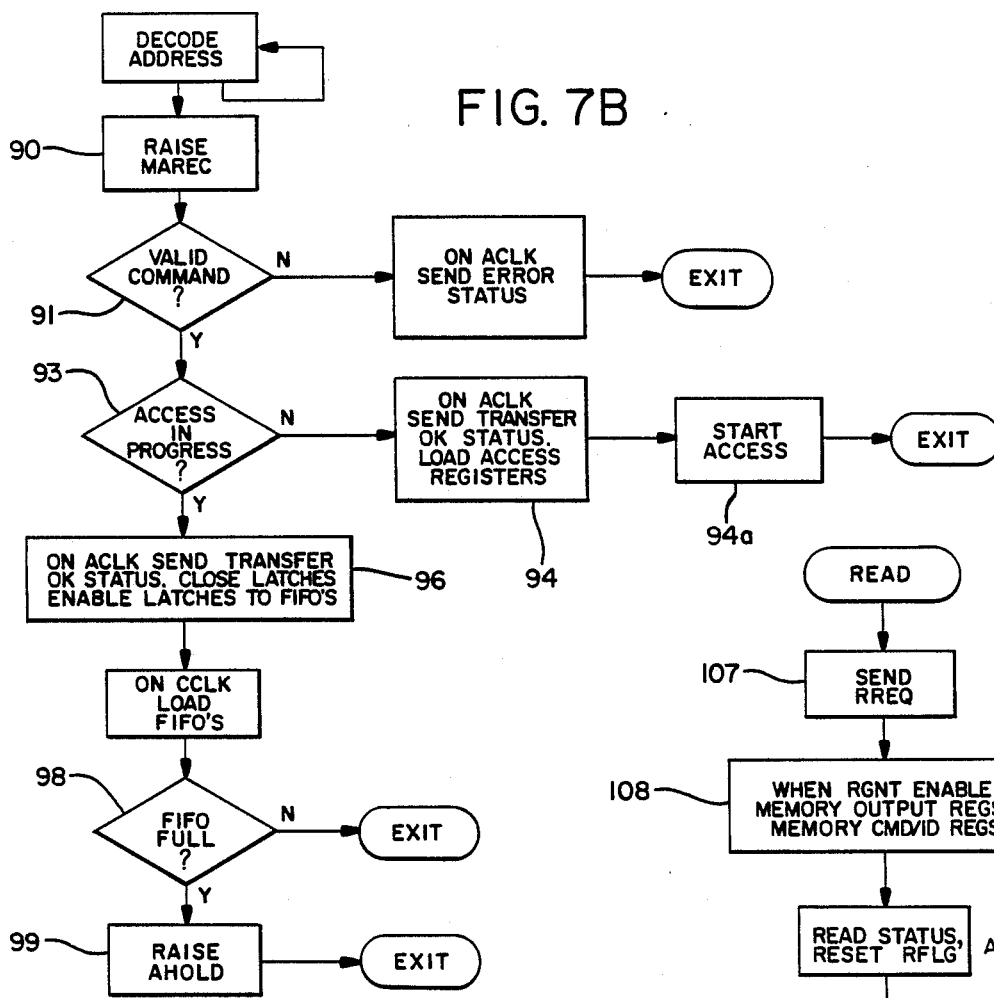
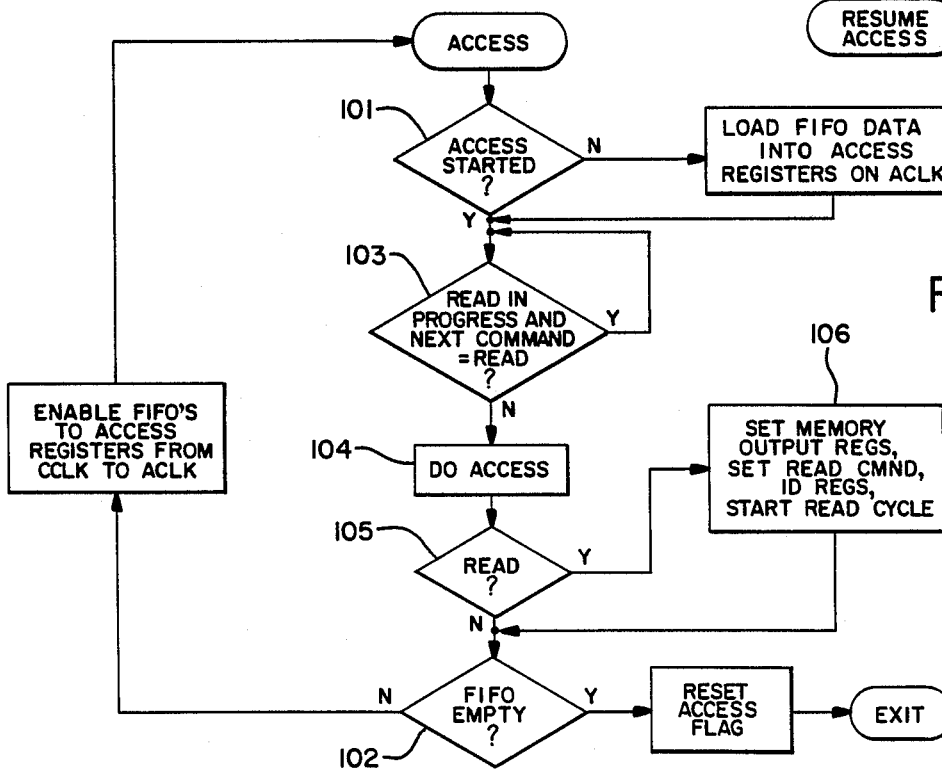

DATA TRANSFER SYSTEM AND METHOD OF OPERATION THEREOF

BACKGROUND OF THE INVENTION

This invention relates to the transfer of data within a data processing system, and more specifically to the interchange of data among the data units of one or more data processing systems. It provides the capability of maintaining a number of different data transfer streams between two or more data units, simultaneously, by use of time division multiplexing.

Most data processing systems include a data bus to which system data units, such as processors, peripheral interfaces, and memory devices, are coupled in parallel. The bus provides a common conduction path on which the units transfer data between themselves. In order to transfer data to another unit, a unit gains access to the bus for a period of time sufficient to complete the transfer.

Older data systems normally comprise a bus linking a system processor, system memory, and one or more peripheral data units such as data keyboards and off-line data storage devices. In these systems the processor conventionally includes a bus access controller which autocratically grants access to the bus according to the requirements of the processor. Characteristically all of the data transfers on the bus are initiated and controlled by the processor through the controller.

In such systems control of communications between data units by the system processor typically limits the efficiency of communications between the data units. While this problem has been overcome in some large scale computing systems by crossbar logic circuitry, such architecture is inordinately complex and, hence, impractical for many applications.

More recent data processing systems are marked by the distribution of processing capability and responsibility among a plurality of separate, autonomous processors. As a consequence the requirements for bus access are no longer centralized and a number of processors may raise concurrent, equally urgent requests for use of the bus.

Consequently a means and a mode for bus access control is required which satisfactorily resolves competing bus access requests from a plurality of data processing system units. Such satisfactory resolution should provide each processing system unit with timely access in order to preserve the freshness of the data which it seeks to transfer to or obtain from another unit. At the same time the bus system control mechanization should not produce an unreasonable decrease in system operating efficiency by adding unnecessarily to the amount of system operational time which is devoted solely to implementing the control.

A data processing system exemplifying the older technique of data bus control is disclosed, for example, in Cohen et al., U.S. Pat. No. 3,710,324, wherein a controller responds to requests by system units for data bus access by granting control of the data bus operation to the requesting units on a basis of preestablished priority. When control is granted to a data unit, all other bus users are excluded from access to the bus while the unit receiving the grant conducts a data transfer on the bus. Several features of the bus control mechanization of this system reduce its operational efficiency. For example, in establishing control, a plurality of successive handshaking signals precede the actual data transfer for which control is obtained. Furthermore, a data transfer can comprise any one of a number of possible modes of operation, each of which require a separate synchronization procedure together with the means to implement it. Finally, there is only one path upon which system data may be interchanged. This means that the system memory response bandwidth is limited by the need to utilize the data bus for nonmemory data transfers as well as for memory access transfers.

Another type of data transfer system is taught in Durvasula et al., U.S. Pat. No. 4,245,303 wherein a memory element attached to a data transfer bus has associated with it a controller which prevents other units from addressing the memory when it is oversubscribed with data transfer requests. However, since the memories of this system are connected to a single data signal path in common with the other system elements, memory transfers must still compete with data transfers between other system elements. This competition unavoidably lengthens the aggregate memory response time of the system.

While many existing data transfer systems do exhibit a number of inefficiencies which use of a novel data transfer system may eliminate, it is neither practical nor possible to supplant all of the older systems with the new one. Rather a period of transition must follow the introduction of the new transfer system, during which the new system is applied to satisfy the transfer requirements of emerging data systems, while preexisting data systems continue to utilize the prior, inefficient transfer systems.

During the transition period, it would be desirable to operate an existing data transfer system in a coupled arrangement with a new system which would allow the systems to conduct inter-system data transfers. Such an arrangement could permit the existing system to enjoy the efficiency of the new system with a minimum of changes to existing software. Provision of an inter-system coupling device which could connect the systems in an efficient, complementary manner would constitute a desirable advancement of the data transfer art.

SUMMARY OF THE INVENTION

The present invention comprises a data transfer system which provides a means and a technique for maintaining a number of simultaneous data transfer streams between a plurality of data units. The data units may constitute, for example, a data processing system wherein each data unit provides data to be transferred to another system unit or receives data which has been transferred from another system unit.

Simultaneous transfer of data streams between data units is made possible by system architecture which employs a data bus having a bandwidth greater than the total bandwidth required for simultaneous transfer of data among any of one or more combinations of all data units, and which permits interleaving of the various data streams communicating over that bus.

In the system of the invention, data transfer is efficiently implemented by making each transfer dependent solely upon one control signal granting the transferring data unit access to a bus for the purpose of accomplishing the transfer, and further by making any transfer independent of any subsequent transfer which it is intended to stimulate. This dispenses with the need for an elaborate handshaking protocol comprising a multiplicity of signals which must be observed before a data transfer can be implemented. In addition, it eliminates the need for defining a variety of bus transfer modes, each of which would have to be established by a respective transfer state of the bus control protocol.

Accordingly, the system of the invention includes a data interchange bus whereupon data may be transferred between a plurality of interchange adapters. An interchange adapter constitutes a means for coupling data from a data unit onto the bus, or off of the bus to the unit. The adapter includes request circuitry which produces a request signal when it requires access to the data bus for transferring data. Each adapter further has circuitry for coupling the output data onto the data bus upon the occurrence of a grant signal. The system also includes a data interchange bus control unit which is coupled to intermittently receive request signals from the interchange adapters of the system. After each reception of request signals, the control unit provides grant signals to the interchange adapters which produced the received request signals, the grant signals being provided in a sequence corresponding to a predetermined priority basis.

The data interchange bus of the invention includes separate data, address, and control signal paths. The data signal paths, in turn, include a write data path for transferring data which originates from a nonmemory data unit and a read data path for transferring data which originates from a memory data unit. Provision of a separate data path for data which is transferred from memory units eliminates nonmemory data transfers from competition for the read bus, and removes the time required to service nonmemory data transfer requests from the aggregate memory response time of the system.

In the system of the invention, data interchange adapters are provided which are intended for use with nonmemory data units such as processors. The data interchange adapters alone drive the address and write data signal paths. The read data signal path is driven only by memory interchange adapters which are intended to serve storage memory arrays.

A second embodiment of a data interchange adapter includes three bidirectional data transfer ports, one of which may be coupled to a host data bus system and another to a private data bus system. The third port is coupled to the data interchange bus of the invention. The adapter includes bidirectional transceivers associated with the first two other data ports; data interface circuitry which conducts transactions with the data interchange bus is associated with the third. The transceivers and the interface circuitry are coupled between their associated data ports and a bus which is internal to the adapter. A transfer controller in the adapter controls the states of the transceivers and the interface circuitry so that a data interface path may be selectively provided between any two ports of the adapter over the internal bus. Data entering any port of the adapter contains control information regarding the operation mode under which it is being transferred and its intended destination. The control information is provided to the transfer controller, which causes the adapter to be placed in a configuration permitting the data to be conducted to the device associated with the port through which the data must exit in order to reach its desired destination.

Accordingly, it is a principal object of the present invention to provide a data transfer system which efficiently transfers data between a plurality of data units.

It is another principal object of the invention to provide such a system which can maintain a number of data streams between two or more data units simultaneously.

It is a principal feature of the invention to provide such a system in which data transfers are enabled by the provision of a simplified control mechanism.

It is another principal feature of the invention to provide such a system in which a data transfer is made independently of any other data transfers which it may stimulate.

It is a further feature of the present invention to provide such a system having a read data path which is reserved for transfer of data which originates from a memory data unit, the read data path being separate from a write data path which is provided for the transfer of data originating at a nonmemory data unit.

It is a still further feature of the invention to provide a data interchange adapter having three bidirectional data ports and the capability to selectively establish bidirectional transmission between any two of those ports.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 5B is a diagram illustrating the operational states of the portion of the first embodiment data interchange adapter.

FIG. 6A is a block diagram illustrating a section of the first embodiment data interchange adapter of the invention used for coupling data off of the write signal path of the data interchange bus. FIG. 6B is a diagram illustrating the operational states of the section of the first embodiment data interchange adapter illustrated in FIG. 6A.

FIGS. 7B, 7C, and 7D are flow diagrams illustrating the operation of the memory interface adapter illustrated in FIG. 7A.

DETAILED DESCRIPTION OF THE INVENTION

Figure 1:
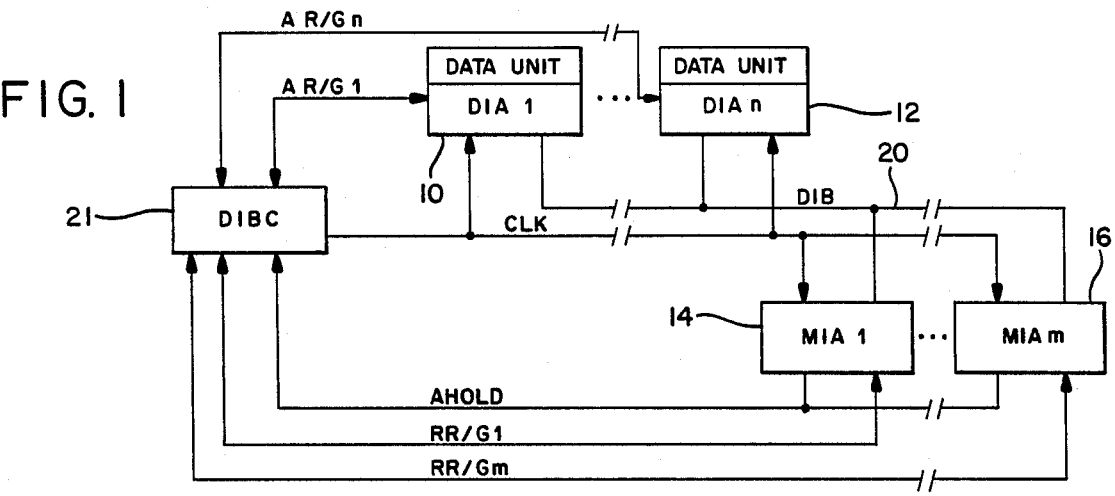
FIG. 1 is a block diagram of the system of the invention illustrating its major components and its primary signal paths.

The data transfer system illustrated in FIG. 1 includes one or more data interchange adapters (DIA) 10 and 12, one or more memory interchange adapters (MIA) 14 and 16, and a bidirectionally conducting data interchange bus (DIB) 20 to which all system DIA's and MIA's are coupled in order to exchange data amongst themselves. The system also includes a data interchange bus controller (DIBC) 21 which controls access of the system interface adapters to the DIB 20 in a manner explained below.

Each DIA provides the means for a nonmemory data processing unit such as a processor, a peripheral storage device, an input device, or display device, to couple data to and from the DIB 20. An MIA provides the coupling interface to the DIB for a memory storage device such as a random-access memory array.

Figure 2:
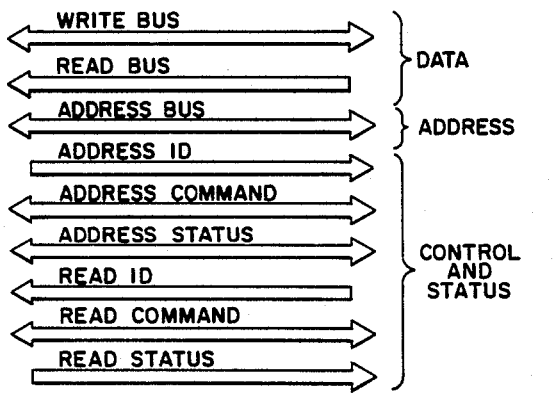
FIG. 2 is a diagram illustrating the signal paths which constitute the data interchange bus of the invention illustrated in FIG. 1.

The data interchange bus 20 of the invention, illustrated in FIG. 2, comprises data, address, and control signal paths. Some of these signal paths are bidirectional in that they can be driven by a DIA to transfer information to any other DIA or MIA in the system. Others are unidirectional in that they are driven only by MIA's to transfer data to DIA's or by DIA's to transfer signals to MIA's. In the DIB 20, the data signal paths comprise one group of 32 bidirectionally-conducting paths termed the WRITE bus; the READ bus, also comprising 32 wires, is unidirectional and used to transfer data from a memory to a nonmemory data unit. A group of 32 bidirectional signal conductors is designated as the ADDRESS bus and is used to transfer address signals. In the control signal paths there are three separate groups of conductors for transporting signals which are related to a system ADDRESS cycle. The first group, comprising seven wires, conducts address identification (ID) signals from the DIA's to the MIA's. A second group of three conductors bidirectionally transfers address command signals from any DIA to any other DIA or MIA. A third group of three wires conducts address status signals from any DIA to any other DIA or from any MIA to any DIA. Three other groups of control signal paths are for conduction of control signals related to a READ cycle. The first two groups of read control signals paths are for conduction of read identification (ID) and read command signals from an MIA to any DIA. The read identification path comprises seven signal wires, and the read command path, two. Finally, two conductors transfer read status signals from the DIA's to the MIA's.

In addition to the common signal paths provided by the data interchange bus, two signal paths (AR/G) are provided between each DIA and the DIBC. One path is for conducting an address cycle request (AREQ) signal from the DIA to the DIBC, and the other for conducting an address cycle grant (AGNT) signal from the DIBC to the DIA. Similarly, there are separate path pairs (R/RG) extending between each MIA and the DIBC for conducting read cycle request (RREQ) signals from the MIA's to the DIBC and for transferring read cycle grant (RGNT) signals from the DIBC to the MIA's. Finally, the DIBC produces a multiphase clock signal (CLK) which is distributed on the CLK signal line to all DIA's and MIA's.

Figure 3:
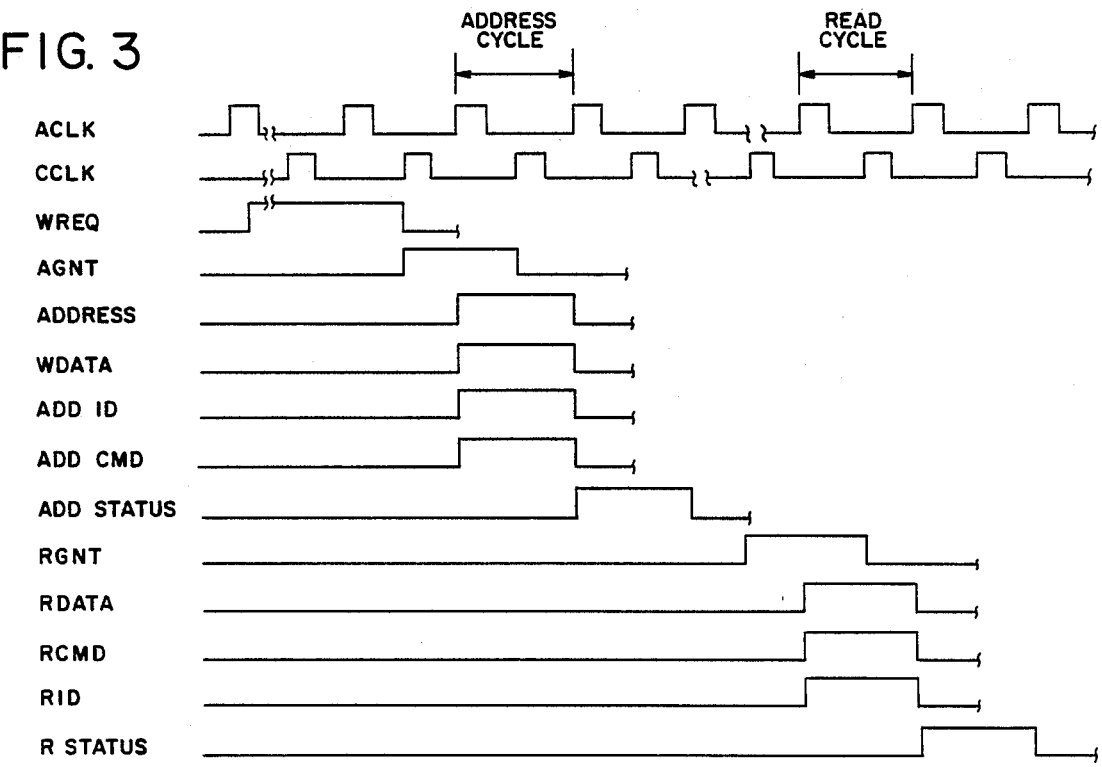
FIG. 3 is a waveform diagram illustrating the operation of the data transfer system of the invention.

The operation of the system of FIG. 1 may be understood with reference to FIG. 3. All system transfers are synchronized by the multiphase CLK signal distributed by the DIBC. As is conventional, the distributed CLK signal may comprise four separate clock signals, each displaced by 90° from another. Two of these separate signals are illustrated in FIG. 3, with the ACLK waveform indicating the primary or 0° clock signal and the CCLK wave form indicating a 180° displacement of the ACLK signal. Not illustrated are a BCLK and a DCLK signal, which represent ACLK delayed by 90° and 270°, respectively.

A system operation cycle is defined by one complete cycle of the ACLK signal. There are but two bus cycles which characterize operations undertaken by the system: an ADDRESS cycle and a READ cycle. During an ADDRESS cycle any DIA having access to the ADDRESS and WRITE buses may transfer an address and data over those buses to any other DIA or to an MIA. An ADDRESS cycle transfer to another DIA can constitute an operation in which the information transferred is in the form of data such as might be the product of or an input for a processing operation. The information transferred to another DIA during an ADDRESS cycle may also constitute an instruction to be executed by the destination data unit by means of, for example, an interruption subroutine. Data transferred during an ADDRESS cycle operation to an MIA may constitute data to be held at an addressed data storage location. Alternatively, in lieu of data, a READ MEMORY command, explained below, may be transmitted on the address command signal path, in response to which the MIA will retrieve data stored at an addressed location and transmit the retrieved data to the requesting DIA in a subsequent READ cycle operation.

READ cycle data transfers are conducted solely on the READ bus. A READ cycle operation consists of a transfer of data which has been retrieved from storage by an MIA. The data is transferred by the MIA to a DIA which has requested it during a previous address cycle operation.

The only independent transfer operations on the DIB 20 are those which may occur during an ADDRESS cycle. These operations may not require a responsive ADDRESS or READ operation if they consist of, for example, interrupt transfers to other DIA's or data storage procedures carried out with MIA's. On the other hand they may stimulate subsequent ADDRESS or READ cycle operations if they constitute, for example, requests for data from another data unit or a memory device. The operation of the invention does not require that an ADDRESS or READ cycle operation which is responsive to a prior ADDRESS operation immediately follow the stimulating ADDRESS cycle. Rather, the responsive operation may be performed at a time subsequent to the stimulating operation when the responsive data unit is able to complete the transaction.

To initiate an ADDRESS or READ cycle an interchange adapter must have received an AGNT or RGNT signal, respectively, from the DIBC. AGNT signals are directed to DIA's and RGNT signals to MIA's An AGNT or RGNT signal is produced by the DIBC in response to an address cycle request (AREQ) or read cycle request (RREQ) signal which an interchange adapter will have provided to the DIBC 21 at a time its associated data unit has data ready for transfer on the DIB 20. For example, when a DIA has received data from its associated processor or data unit which is to be transferred either to another DIA or to an MIA, it will provide an AREQ signal to the DIBC on its dedicated AR/G signal line. At a subsequent time, the DIBC 21 will take a "snapshot" or latch in all of the address cycle request signals which have been raised since the last snapshot, and will produce a sequence of AGNT signals to satisfy the request signals latched in the current snapshot, with each grant signal provided to a DIA whose request signal has been latched in. The order of the grant signal sequence may be based on a predetermined priority arrangement, with the access requests being satisfied in an order corresponding to the priority of the data interchange adapters which raised them. The grant signals are provided consecutively during the sequence at a rate corresponding to the CCLK signal. When all of the requested grant signals have been provided, the DIBC again inspects the request signal lines and, in another request snapshot, latches in all of the AREQ signals which have been raised since the previous snapshot was taken.

In a similar manner, the DIBC 21 periodically inspects the read request signal lines connected to the MIA's, latches in the RREQ signals which have been raised, provides RGNT signals in response to the latched request signals in a sequence corresponding to a predetermined MIA priority ranking, and, after completion of the sequence, again inspects the request lines and takes another snapshot by latching the lines.

The timing and synchronization of representative ADDRESS and READ cycles are illustrated in FIG. 3. To initiate an ADDRESS cycle operation, a DIA raises an address request, AREQ, for access to the ADDRESS and WRITE buses. At the beginning of a CCLK cycle subsequent to the latching of the AREQ signal, an address grant (AGNT) signal is provided to the requesting DIA indicating that the DIA will have access to the ADDRESS and WRITE buses during the following ACLK cycle. The period of access is indicated in FIG. 3 by ADDRESS CYCLE. During the ADDRESS CYCLE, the DIA which has been granted access will output an address signal (ADDRESS) on the address signal paths indicating the interchange unit with which a transfer operation is to be performed and may also place data to be transferred on the WRITE bus. Concurrently, the DIA also can provide signals indicating its own address (ADD ID) on the address identification conductors. Finally, information regarding the type of action to be taken by the receiving interchange adapter is produced by the DI as an ADD CMD signal on the address command conductors.

During the ACLK cycle immediately following an ADDRESS cycle, the destination interchange adapter outputs an ADD STAT signal on the address status conductors indicating its response to the address and address command which it has recognized during the cycle.

In a similar manner, to transfer data obtained from memory a requesting MIA raises an (RREQ) signal (not shown) in response to which a subsequent RGNT is provided for one cycle of CCLK. During the immediately following ACLK cycle, labeled READ CYCLE in FIG. 3, the data from the desired memory location, RDATA, is output on the READ bus, an RCMD signal is output on the read command conductors, and the RDID signal reflecting the address ID of the DIA to which the data is to be transferred is placed on the read identification signal lines. The destination DIA recognizes its ID and collects the data from the read bus and outputs an R STATUS signal on the read status lines during the subsequent ACLK cycle.

The system structure and protocol illustrated and discussed above provide several significant improvements over prior art data transfer systems. The principal advantage lies in the autonomy of every bus transfer operation. That is, the initiation and control of each operation are dependent only upon signals produced by the interchange adapter requiring access to the DIB 20 to make the transfer. Thus even ADDRESS and READ cycles which are responsive to prior ADDRESS cycle operations need not immediately follow the stimulating ADDRESS cycle, and require no elaborate handshaking between the initiating and destination DIA's to effect a complete cycle of stimulus and response.

Another advantage lies in the fact that, if bus access is requested, it is automatically granted within the time required to latch the request signal and to produce a sequence of grant signals. It should be evident that the time required to service one snapshot of access requests will determine the period of time available to receive a following group of access request signals. Moreover, as the status of each DIA is essentially equivalent to the status of every other DIA, the granting of access requires no interruption or usurpation of another adapter's access. Finally, access is simply granted by the exchange of two signals, without the production of either signal interrupting the operations of the READ or the WRITE and ADDRESS buses.

The differentiation of the data transfer facilities into an ADDRESS bus, a WRITE bus and a READ bus increases the data transfer efficiency of the system and permits the continuous flow of address, command and data information, cycle by cycle, from random source DIA's to random destination DIA's, regardless of the mixture of read and write operations. This is in contrast to prior art data transfer systems which provide only a single data bus for both read and write data transfers or a single bus for both address and data transfers. In those systems, overall bus performance is affected by the mixture of read and write operations and random sources transferring to random destinations are not facilitated.

In the present invention, the combination of continuous address, command and data flow from random sources to random destinations, coupled with periodic arbitration to ensure all requesting devices have equal access to the bus, allows the DIB 20 to be used as a very inexpensive and simple crossbar connection between all DIB interfaces. This is in contradistinction to prior art bus systems which provide for either a single source and random destinations or random sources and a single destination. It also differs from systems which have a set priority which will allow some interfaces to be locked out for long periods of time. In either case the prior art bus is not suitable for use as a crossbar connection. Moreover, in prior art data transfer systems which employ the use of crossbar connections, the crossbar interconnect is made up of a complex network of multiplexers and the circuitry required is a function of $n^2$ where n is the number of nodes in the network.

Time division multiplexing of signals conducted over the system bus, that is DIB 20, is employed in the present invention to permit simultaneous transfer of data among predetermined combinations of data units. For example, several pairs of data units may be communicating with one another and a single data unit may be communicating with several others, all simultaneously. In contrast to crossbar systems wherein the simultaneous transfer of data among data units is limited by the amount of interconnecting logic circuitry, the present system only requires that the data transfer bandwidth of the system data bus be greater than the total bandwidth required for simultaneous transfer of data among any of the predetermined combinations of said data units, thereby reducing the system complexity required for such communications.

Figure 4:
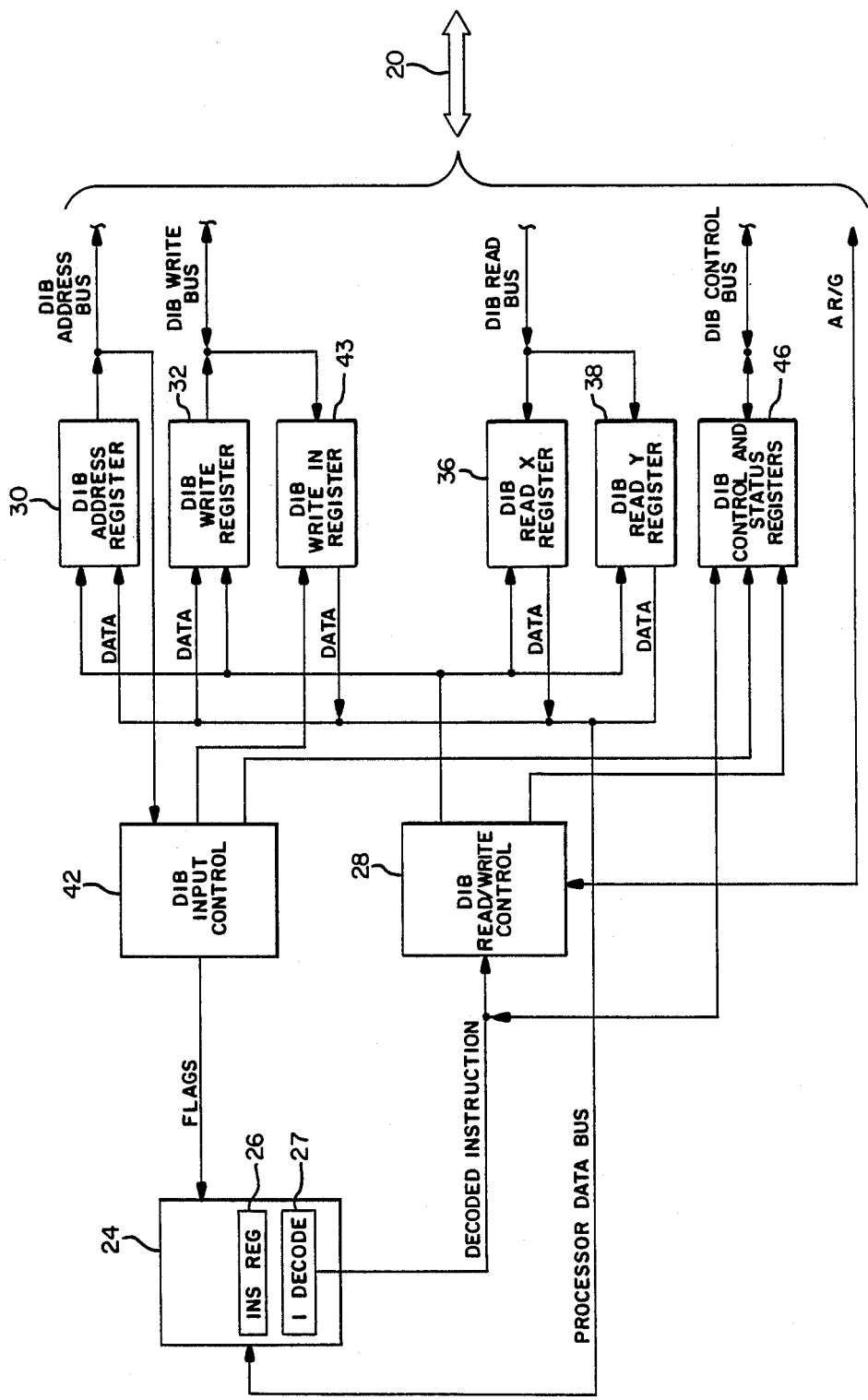
FIG. 4 is a general block diagram illustrating a first embodiment of the data interchange adapter of the invention.

FIG. 4 illustrates in greater detail the interconnection of the DIA 10 with the DIB 20. In FIG. 4, the DIA 10 includes a processor 24 capable of conventionally providing data to be transferred, an address which designates the destination data unit, and control signals appropriate to cause the DIA registers to perform the required DIB access. The processor may be used in any arrangement known in the art to control and interface data transfers between an external data unit, such as a disk, tape, or other processor, and the DIA 10. The processor may comprise, for example, a conventionally programmable bit-slice microprocessor having an instruction register 26 where the current instruction is held. As is well known, the instructions may be decoded by an instruction decoder 27. The decoded instructions may be provided as control signals to other DIA interface circuitry to initiate data transfers.

When the current DIA processor instruction requires the transfer of data to or from another adapter over the DIB 20, the processor 24 provides a control signal indicating the requirement to start a DIB operation. This signal, designated STDIB, is received by a DIA read-/write control circuit 28 which synchronizes all write and read operations in the DIA.

Control signals are output by the read/write control circuit 28 to a DIB address register 30 (which has conventionally received the address of a destination DIA or memory location from the processor), causing the address to be coupled onto the ADDRESS bus portion of the DIB. A DIB write register 32 is controlled by the control circuit 28 to couple data received from the processor 24 onto the WRITE bus. A DIB READ X register 36 and a DIB READ Y register 38 couple data from the READ bus under supervision of the control circuit 28. Data is transferred to the processor 24 from the DIA read registers by conventional means.

Information transfers from the WRITE bus into the DIA are synchronized by the DIA input control circuit 42. Generally, data is input to the DIA 10 when the DIA control circuit 42 recognizes the DIA's address on the ADDRESS bus. At that time, the DIB write-in register 43 is activated, capturing the data placed on the WRITE bus. The captured data is subsequently transferred conventionally to the processor 24.

A block of DIB control and status registers 46 either terminate or drive certain of the control signal paths as explained hereinbelow.

The operations of a DIA in transferring data on the DIB can be understood with reference to FIGS. 5A, 5B, 6A, and 6B. In the DIA 10, the read/write control circuit 28 comprises a write control sequence circuit 50 and a read control sequence circuit 52, both of which receive input signals from the processor 24 and DIA signal paths. Any ADDRESS cycle operation on the DIB is initiated by the provision to the write sequence circuit 50 of an STDIB signal. The STDIB signal indicates that the processor 24 has entered into the address register 30 the address of a system DIA or MIA. It may also indicate that data has been placed in the write register 32 for transfer to the addressed adapter. In order to distinguish read operations from write operations the read sequence circuit 52 also receives an address command signal, in the form of an octal code comprising 3 bits, which specifies the desired WRITE cycle operation. These signals may be output, for example, by the instruction decoder of the processor 24 on processor control signal lines denoted as STDIB and PADCMD, and input to the read sequence circuit 52 on identically-labelled signal lines.

Appropriate address commands are listed in Table 1. When a READ MEMORY command is provided, the read sequence circuit 52 also receives a digital code denoting the read register which is to couple the data from the READ bus. This can also be provided from the processor 24 on the signal lines labelled RDRGID and received by the DIA 10 on similarly designated lines.

TABLE I

| ADDRESS COMMANDS | | |
|---|---|---|
| ADDRESS COMMAND | OCTAL CODE | COMMAND FUNCTION |
| 32-bit READ MEMORY | 1 | 32 bits of data are to be extracted from an indicated memory location and transferred to DIA 10 on a subsequent READ cycle. |
| 8-bit WRITE MEMORY | 2 | 8 bits of data are to be transferred from DIA 10 to an indicated MIA for storage at an indicated memory location. |
| 16-bit WRITE MEMORY | 3 | 16 bits of data are to be transferred from DIA 10 to an indicated MIA for storage at an indicated memory location. |
| 32-bit WRITE MEMORY/DIA | 4 | 32 bits of data are to be transferred from DIA 10 to an indicated MIA for storage at an indicated memory location or transferred to an indicated DIA. |
| INTERRUPT DIA | 5 | 32-bits of data are to be transferred to and the interrupt flag set in the addressed DIA. |

At the same time that the processor 24 provides an ADDRESS cycle instruction to be decoded by the instruction decoder 27, it may be programmed to provide address data to the DIB address register 30 over a conventional processor data bus. In the event that a READ MEMORY command or a write command directed to an MIA is produced, the most significant ten address bits are used to indicate the address of the MIA and the 22 least significant address bits are used to indicate the memory storage space to be addressed. When an ADDRESS cycle operation is directed to a DIA, all of the most significant 22 bits of the address field are set to a logic "high" state to indicate that a DIA is being addressed, while the ten least significant bits contain the address of the destination DIA.

When an ADDRESS cycle WRITE command is to be performed, the data to be transferred is entered into the DIB write register 32. This may also be done over the processor data bus. For an INTERRUPT command, a 32-bit data field is entered into the DIB write register 32. The INTERRUPT data field may contain both an instruction which the addressed DIA will execute under a conventional interrupt procedure, and the address of the DIA which is transferring the interrupt on the DIB. During an ADDRESS cycle which is initiated by a READ MEMORY command, no data is entered into the DIB write register 32.

During the execution of ADDRESS cycle operations by the DIA 10, the octal code representing the address command is entered from the processor 24 into the address command buffer 54 which forms part of the bank of control and status registers 46. During ADDRESS cycles in which an MIA is to be addressed, the RDRGID code and DIA address identification code are entered into the address identification buffer 56. The DIA's identification code may be derived from a backplane slot in which the DIA resides or from a microswitch array. Should the ADDRESS cycle comprise a READ MEMORY command, the octal code representing the read register to which data is to be directed during a subsequent READ cycle is entered into the most significant 2 bits of the address identification buffer 56.

During all ADDRESS cycles, the address command, and RDRGID signals are all fed to the read control sequence circuit 52 which synchronizes the sequence of operations in DIA 10 necessary to complete READ transactions. During such READ MEMORY transactions, the read control sequence circuit 52 provides signals which are appropriate to arm a gate associated with the designated read register so that, during the responsive READ cycle, the data will be entered into the identified register.

The sequence circuits 50 and 52 may comprise, for example, one or more registered programmable logic arrays which are programmed to produce the sequence of states and signals defined hereinbelow. Such devices are available from Monolithic Memories, Inc. The registers 30, 32, 36, 38, 54 and 56 may comprise well-known register devices.

Figure 5A:
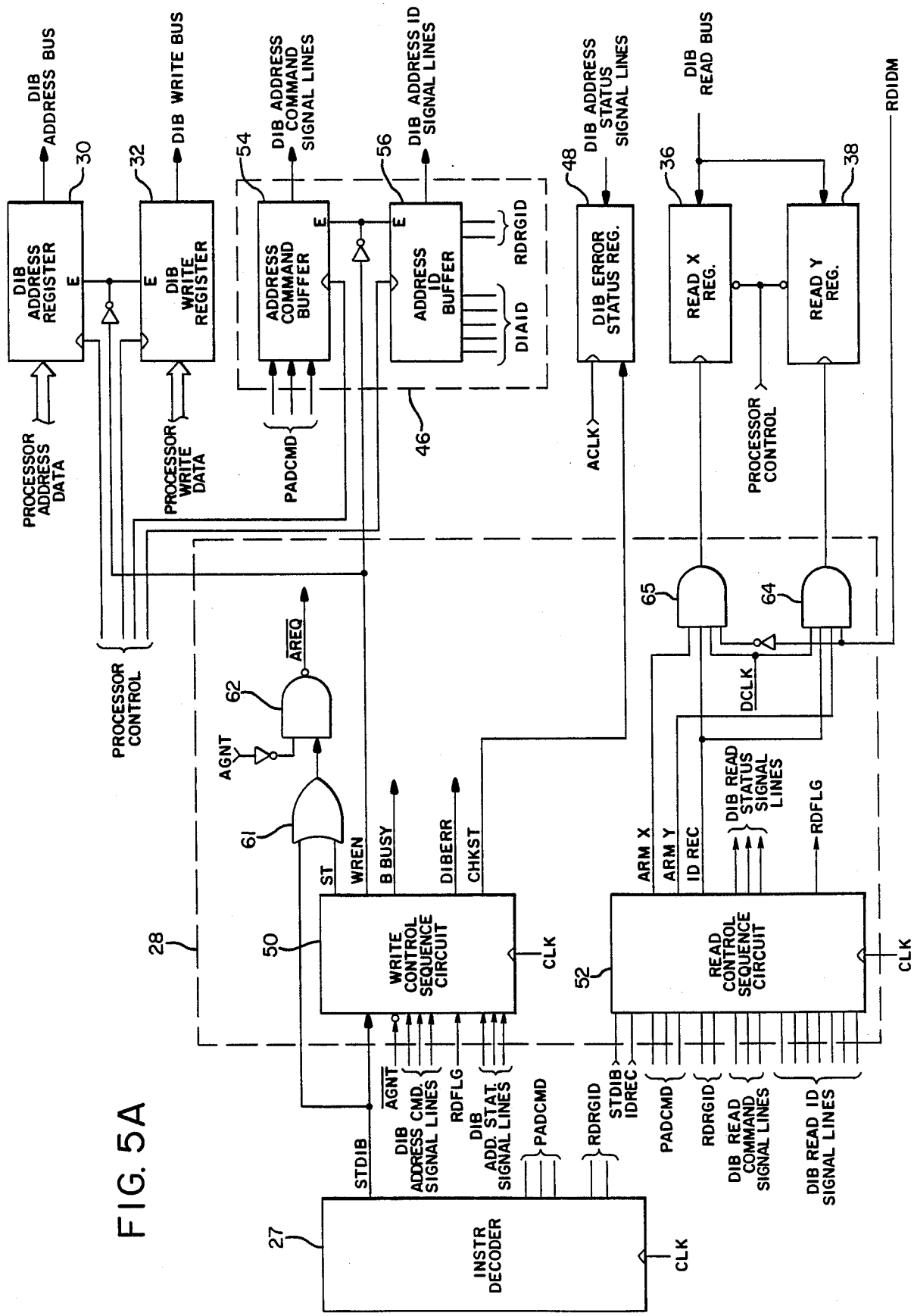
FIG. 5A is a detailed block diagram illustrating sections of the first embodiment data interchange adapter used for coupling data onto the write data signal path of the data interchange bus, and for coupling data off of the read signal path of the data interchange bus.

The series of operations which DIA 10 undergoes to complete an ADDRESS cycle can be understood with reference to FIGS. 5A and 5B. When a DIB WRITE command is to be performed, the STDIB signal is output from the processor 27 and provided to the sequence circuit 50 and to the NOR gate 61. STDIB causes the sequence circuit 50 to enter state W1. At the same time, if AGNT is negated, $\overline{\text{AREQ}}$ (output by the NAND gate 62) is sent to the DIBC 21 to indicate that the DIA is requesting access to the ADDRESS and WRITE buses. At the first concurrence of the STDIB signal and a rising edge of ACLK, the sequence circuit 50 enters state W2, wherein an ST signal is raised to a logic high state. The ST signal is combined with STDIB in NOR gate 61, and with the inverted AGNT signal in NAND gate 62. Assuming that AGNT is low, indicating that the DIA 10 has not been granted access to the DIB 20, the output of the NAND gate 62 will stay in a logic "low" state. The $\overline{\text{AREQ}}$ signal will remain in a logic low state until the AGNT signal rises, indicating a grant of access to the DIA 10. The AGNT signal is also fed to the write control sequence circuit 50 wherein it is combined with the ST signal to place the sequence circuit 50 in state W3 at the first positive-going edge of ACLK. During state W3, the ST signal is lowered to prevent transmitting another $\overline{\text{AREQ}}$ until STDIB is again received.

In state W3, the DIA 10 is ready to commence the operations which it must perform during the ADDRESS cycle which has been granted to it. At the beginning of state W3, a WREN signal (WRITE enable) is output by the sequence circuit 50 to drive the contents of registers 30, 32, 54, and 56 onto their respective DIB signal paths. This conforms to the positive states of the corresponding ADDRESS CYCLE waveforms illustrated in FIG. 3. During W2 and W3, the sequence circuit 50 also provides a BBUSY signal which may be fed back to the processer 24 to indicate that information currently in the registers 30 and 32 is being used to conduct an ADDRESS cycle. Such a signal would be appropriate, for example, to prevent the processor from entering any new data into these registers or starting another DIB access during the time when the DIA 10 is performing an ADDRESS cycle. At the first positive-going edge of ACLK after the WREN signal has been produced, the circuit 50 is placed into state W4, and the WREN and BBUSY signals are removed. At this time, the change in state of the WREN signal may be used to decouple the registers 30, 2, 46, and 56 from their associated DIB signal paths. The negation of BBUSY allows the sequence to generate the next $\overline{\text{AREQ}}$ and start the next ADDRESS cycle sequence.

When the sequence circuit 50 enters state W4, it produces an internal signal CHKST (check STATUS) which enables it to read the address status signal lines. During this state, a signal will be placed on the address status line by the addressed DIA or MIA during the ACLK cycle immediately following the ADDRESS cycle. This is indicated by the ADD STATUS waveform of FIG. 3. The status signal is decoded to determine whether the data and the address command transferred during the ADDRESS cycle were correctly received by the destination interface adapter. Should the status indicate an error condition in reception, the sequence circuit 50 will provide a DIBERR signal (DIB error) to the processor. The DIB error status register 63 also decodes the address status signal and preserves the information for later delivery to processor 24, which may use it, for instance, to determine the nature of the error.

At the first positive-going edge of ACLK following the generation of CHKST, the status monitoring is ended (denoted by E), and the sequence circuit 50 is prepared to again monitor the address status lines.

If an ADDRESS cycle is based upon a READ MEMORY command, the DIA 10 will be the recipient of data during a subsequent READ cycle which is responsive to the command. The operation of DIA 10 during the subsequent responsive READ cycle is controlled by the read control sequence circuit 52, the operations of which are synchronized by provision of the appropriate phases of the CLK signal. As is illustrated, the input port of the read control sequence circuit 52 is coupled to the read command and read identification signal lines of the DIB 20.

During state W1 of the address control sequence circuit 50, when the STDIB signal has been provided, the address command signal is decoded by the read control sequence circuit 52. If a READ MEMORY command is decoded, the sequence circuit 52 enters state RX1 or RY1, determined by the RDRGID signal from the processor 24, on the positive-going edge of ACLK to await a responsive READ cycle. At this time the appropriate ARM signal is output by the sequence circuit 52 to arm one of the two AND gates 64 or 65, each of which controls the clock input of an associated read register. The READ control circuit 52 constantly monitors the read identification signal lines. During the responsive READ cycle the MIA which was addressed will provide a signal on the read ID signal lines containing the identification code of DIA 10 as well as a code corresponding to the read register into which the data will be entered. When the sequence circuit 52 recognizes the identification of DIA 10 on those lines, it will produce an IDREC (ID recognition) signal which is provided to the gates 64 and 65. As the most significant bit of the read identification signal assumes a state determined by the read register to be loaded, the signal on the most significant read identification signal line (RDIDM) is provided in positive form to gate 64, and in inverted form to gate 65. This will cause the data which is present on the READ bus to be clocked into the appropriately-armed read register on the falling edge of the DCLK signal occurring during the responsive READ cycle.

At the first positive-going edge of ACLK following production of the IDREC signal, the sequence circuit 52 assumes state RX2 or RY2 (depending upon which read register is to be loaded), during which it clears the ARM signal and places a signal on the read status signal lines. The status signal may comprise, for example, an indication that the DIA was not expecting data or that valid data was received. Then, on the rising edge of ACLK following production of the appropriate status response during state RX2 or RY2, the sequence circuit 52 will end (E) the status phase of its current read response cycle and await another READ cycle. The processor 24 is alerted to the presence of data in a read register by the negation of the register's ARM signal which may be used to set a flag in the processor.

The response of the DIA 10 to the detection of its own address on the ADDRESS bus during an ADDRESS cycle in which it is the addressee can be understood with reference to FIGS. 6A and 6B. This response is controlled by the DIA input control sequence circuit 42 which may include, for example, a group of appropriately programmed, registered, programmable logic arrays. The signals from the ADDRESS bus and the address command conductors of the DIB are coupled to the input port of the input control circuit 42. Circuit operations are synchronized by provision of appropriate phases of the CLK signal.

The control circuit 42 is always in the "wait" state, during which it constantly monitors the ADDRESS bus. When the most significant 22 bits of the ADDRESS signal are high (indicating that a DIA is being addressed) and coincide with the occurrence of the address of DIA 10 in the least significant 10 bits of the address signal, the control circuit 42 will assume one of two states depending upon the condition of an internally-generated DBUSY signal and the validity of the received address command. The control circuit also produces a $\overline{DBUSY}$ signal which is the inverse of DBUSY. One state of the DBUSY signal indicates that data placed in the DIB write-in register 43 during a previous ADDRESS cycle operation has not yet been retrieved by the processor 24. Under these circumstances, or if an invalid command has been received (indicated by INV CMD) or if the processor is not in operation, the control circuit 42 will assume state I1 on the first rising edge of ACLK. During I1, the control circuit drives either a BUSY or an ERROR status onto the ADDRESS status lines. The next rising edge of ACLK terminates I1, as is designated by E in FIG. 6B.

The DBUSY signal will be reset indicating that the processor 24 has retrieved the data, only by provision of a CLRFLG signal to the reset port of the control circuit 42. If, prior to recognition of the DIA's address, the CLRFLG signal has caused the DBUSY signal to be placed in a non-busy state, the control circuit 42 will produce an AREC signal when the most significant 22 bits of the address signal are set logically high and the least significant 10 bits contain the address of DIA 10. Simultaneously with AREC, the control circuit 42 produces a WRITIN signal which is combined with the AREC, $\overline{DBUSY}$ and DCLK signals in NAND gate 67, the output of which will clock the data present on the WRITE bus into the DIB write-in register 36. A transition to state I2 will occur on the first rising edge of ACLK following the satisfaction of these conditions. During I2 a valid transfer status is driven onto the ADDRESS status lines. The next rising edge of ACLK terminates I2, as is designated by E.

Should the received address command constitute an INTERRUPT, an interrupt flag signal DINT will be raised, indicating to the processor 24 that the data in the write-in register 43 constitutes an interrupt command. As with DBUSY, DINT will be reset by CLRFLG, and, if set when the DIA's address is recognized, will send the input circuit 42 to I1. It should be evident that the provision of an INTERRUPT command allows the receiving DIA to respond to a request by the transmitting DIA. This permits a transmitting DIA to stimulate a subsequent, responsive ADDRESS cycle transfer from the addressed DIA by provision of an appropriate command. However, the response may be provided at a later time and at the convenience of the interrupted DIA without holding the DIB 20 available while an interrupting routine is performed. This decouples the stimulating transfer from a responsive one.

The programming of the input control sequence circuit 42 enables it to provide the address status signal which satisfies the described conditions. The signal is produced by the sequence circuit 42 for placement directly onto the address status signal lines with the rising ACLK signal which ends I1 or I2. The control sequence circuit keeps the signal on the lines for one cycle of ACLK.

Figure 7A:
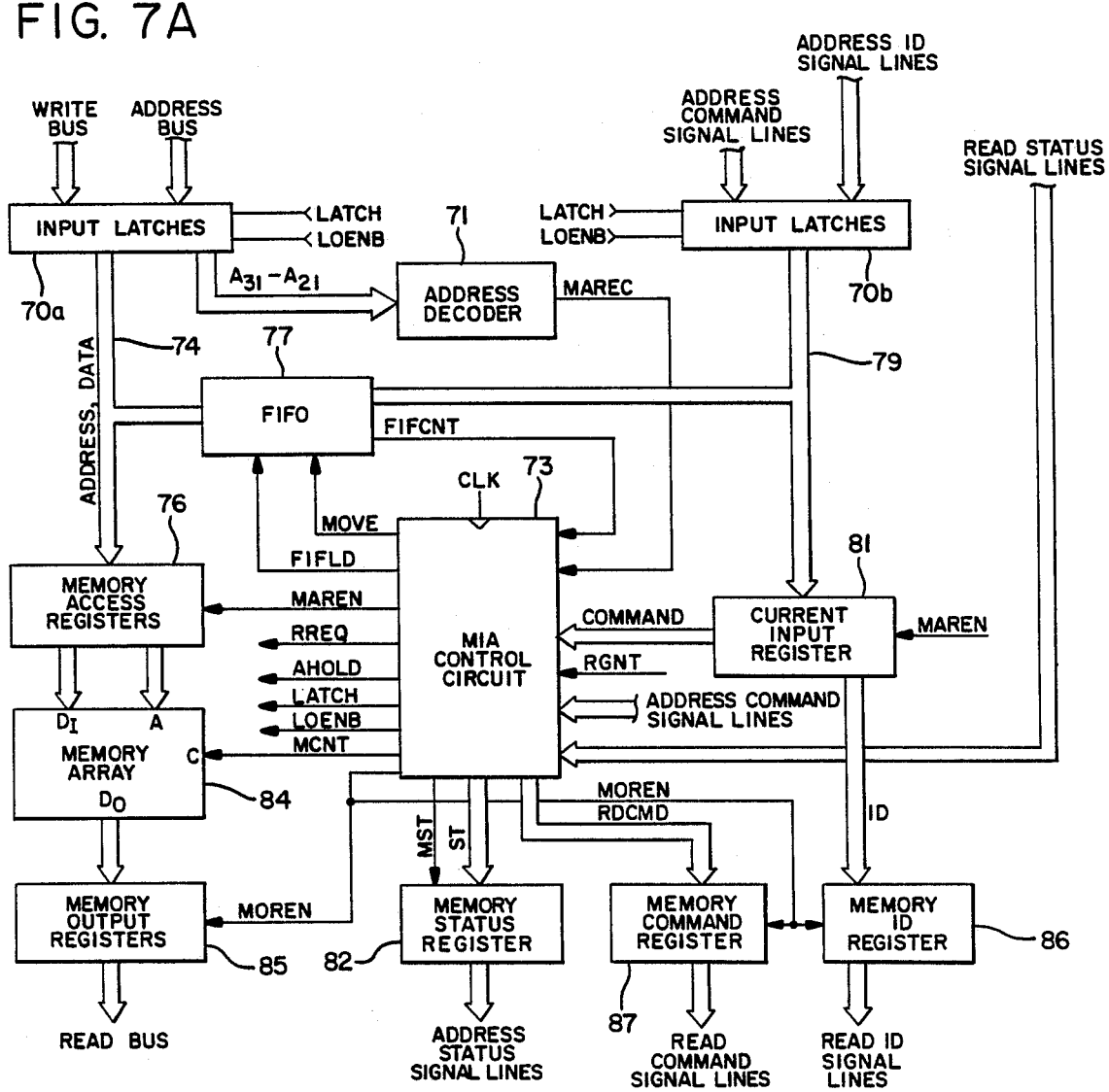
FIG. 7A is a block diagram illustrating an embodiment of the memory interface adapter of the invention together with an associated memory array.

An exemplary construction for the MIA 14 can be understood with reference to FIG. 7A. The input ports of a conventional input latch circuit 70a are connected to couple data signals from the WRITE bus and addresses from the ADDRESS bus of the DIB 20. Another latch circuit 70b is similarly connected to couple signals from the address command and identification conductors of the DIB 20. The latches 70a and b are two-mode devices. In one mode of operation, they will be transparent and pass data from their input to their output ports. In the second mode, they hold the data present on their input ports. The mode is determined by the state of a LATCH signal provided to the latches.

The most significant 10 bits on the ADDRESS bus are always provided through the latch 70a to a conventional gated address decoder 71. This is accomplished by keeping the latch 70a constantly transparent to the ADDRESS bus lines carrying the 10 most significant address bits. Should the address decoder 71 detect the address of the MIA 14, it produces a MAREC signal which is provided as an input to an MIA control circuit 73.

The control circuit 73 may comprise, for example, one or more programmable logic devices which are synchronized by the CLK signals and programmed to appropriately control the operation of the MIA 14. In addition to the MAREC signal, the control circuit 73 also receives an RGNT from the DIBC 21 and signals from the address command and read status signal lines of the DIB 20. When the MAREC signal is produced, the control circuit 73 will cause the WRITE bus data and the least significant 22 bits of the ADDRESS bus signal to be coupled through the latch circuit 70a onto a bus 74 and therefrom into a bank of memory access registers 76 if a memory access operation (explained hereinbelow) is not in progress, or into a conventional FIFO (first-infirst-out) circuit 77 if a memory access operation is in progress. The FIFO comprises a 15-space queue, with each queue space of sufficient width to hold the contents of the latches 70a and b during any ADDRESS cycle. The memory access register 76 can also be loaded under the control of the control circuit 73 from the FIFO 77 over the bus 74. Data is entered into the memory access register 76 upon the production of a MAREN signal by the control circuit 73. The FIFO 77 is loaded by production of a FIFLD signal. A signal path FIFCNT provides FIFCNT signals to the control circuit 73 which indicate the number of FIFO queue slots currently occupied. The control circuit 73 also produces the LATCH signal which controls the latch circuits 70a and b.

The address command and identification are conducted from the latches 70b over a bus 79 to a current input register 81 when no memory operation is in progress, or to the FIFO 77 to be stored therein with the concurrent write and address signals if a memory access is in progress. The address command data in the register 81 is fed to the control circuit 73 to enable it to define the current memory access operation. Use of the address identification data is explained below.

To move data from the FIFO 77 to the access and input registers 76 and 81, the control circuit 73 produces a MOVE signal prior to the MAREN signal. The MOVE signal causes the FIFO to place the first-entered data and address information on the bus 74 and simultaneously-stored address command and identification information on the bus 79. Then, when the MAREN signal is produced, the data on the busses is entered into the registers 76 and 81.

In responding to ADDRESS cycle transfers during which the MIA 14 detects its own address, the MIA control circuit 73 decodes the address command on the DIB address command signal lines when the MAREC signal indicates the presence of the MIA 14 address. After decoding the command, the control circuit 73 will provide an appropriately responsive status signal to the memory status register 82, which is clocked onto the address status signal lines by an MST signal at the first rising CLK edge after receipt of the command. If the command is invalid, the control circuit will not produce the MAREN or FIFLD signals, and the data available on the DIB will not be accepted by the MIA.

The control circuit 73 also controls the operation of a memory array 84, (which may comprise a conventional random-access memory device,) by providing conventionally appropriate memory control (MCNT) signals (such as strobing and read/write signals) to the control port C of the array.

In the event that the MIA 14 is to perform a READ cycle, the data which is to be transferred during the cycle is conventionally extracted from the memory storage location addressed during the cycle and provided by the memory array 84 through its output port $D_o$ to a memory output register 85. This transfer takes place prior to the beginning of the READ cycle during which the data is to be transferred to a DIA. Simultaneously with placement of data in the memory output register 85, the information which was received on the address identification signal lines concurrently with the ADDRESS cycle READ MEMORY command which requested the data is moved from the current input register 81 to a memory identification register 86. At the same time, an appropriate READ cycle command is provided by the control circuit 73 to a memory command register 87. Such commands are listed in TABLE II.

TABLE II

| READ CYCLE COMMANDS | | |
|---|---|---|
| READ COMMAND | OCTAL CODE | COMMAND FUNCTION |
| READ DATA | 4 | 32 bits of data extracted from a memory location in memory array 78 and specified by a prior address command are available on the READ bus. |
| ERROR | 5 | Incorrectable error in READ bus data. (this command is provided if the MIA comprises conventional error detection and correction circuitry which is not shown.) |

When the registers 85, 86 and 87 have been filled in preparation for the performance of a READ cycle, the control circuit 73 will produce a RREQ signal to request access to the READ bus. This signal is conducted to the DIBC 21. In response to the transmission of the RREQ signal, the DIBC 21 will, according to a procedure described below, provide an RGNT signal granting the MIA access to the READ bus.

On the first positive ACLOCK edge following receipt of the RGNT signal, the control circuit 73 provides a MOREN signal to the registers 85, 86 and 87, which places the output of those registers on the READ bus, read command signal lines, and read identification signal lines for the one ACLK cycle, which defines a read signal for the MIA 14.

The operation of the MIA 14 which is illustrated in FIG. 7A, can be understood with reference to FIGS. 7B, C, and D. FIG. 7B is a data entry sequence flow chart illustrating the sequence of operations necessary for data which is transferred to the MIA 14 during an ADDRESS cycle to be accepted by the MIA.

Initially, the current address on the ADDRESS bus is decoded. When the MIA address is recognized, the MAREC signal is raised in step 90 indicating that an operation is required of the MIA 14. Then the control circuit 73 first determines whether the address command is valid (decision block 91). If the command is invalid, the appropriate status signal is entered into the status register 82, the negative exit from decision block 91 is taken, and the status is placed on the address status signal lines during the ACLK cycle immediately following the occurrence of the MAREC signal and the invalid command. The control circuit 73 then takes no further action and assumes a ready condition if it has no other operations in progress. It should be evident that the control circuit 73 may be appropriately configured to respond to a MAREC and interpret another ADDRESS cycle command during the time that it is transmitting a status response to a previous ADDRESS cycle. This will enable the MIA 14 to respond to successive ADDRESS cycles.

Should the address command be valid, the positive exit is followed from a decision block 91 and, if no memory access operation is in progress, the negative exit may be followed from the decision block 93.

A memory access operation is indicated by the condition of a start memory access flag. In one state, the flag indicates that the access register 76 and input register 81 currently hold data which is necessary to perform an as-yet unexecuted READ or WRITE operation. Should the flag indicate that an access operation is not in progress, then LATCH signal is set to the transparent mode and, as indicated in step 94, the MAREN signal is raised by the sequence circuit 73. This enables data on the WRITE and ADDRESS buses to be passed through the latches 70a entered into the memory access register 76 and signals on the address command and identification signal lines to be passed through latches 70b and entered into the input register 81. At the same time, a status signal which appropriately responds to the ADDRESS cycle just completed is provided by the control circuit 73 through the status register 82 as described hereinabove. Then, as no memory access is in progress, the control circuit 73 sets the access flag and is able to perform the access sequence illustrated in FIG. 7C.

Returning to decision block 93, should a memory access operation be in progress when the MAREC signal occurs together with a valid address command, the positive exit will be followed and the input latches 70a and b will be closed to hold the data which is currently on the DIB busses and signal lines which feed their respective inputs. This operation happens on the positive edge of ACLK which occurs in the current ADDRESS cycle and is represented by step 96.

On the ACLK transition that enters data into the latches, the control circuit 73 outputs a LOENB signal, to drive the latched data to the FIFO inputs. On the following CCLK, LOENB is negated and FIFLD causes the data in the latches to be entered into a storage location of the FIFO 77. This preserves the ADDRESS cycle data in the FIFO 77 and enables the MIA 14 to take the action required by the address command at a time subsequent to the cycle. The MIA 14 is thereby permitted to be addressed during an ADDRESS cycle while it is carrying out a memory access operation associated with a previous ADDRESS cycle. It should be evident that this allows a memory access cycle to be decoupled from the ADDRESS cycle which stimulated it. That is, the MIA 14 will be enabled to perform the required memory access cycle at its convenience. This eliminates the need for an exchange of synchronizing signals between a DIA and the MIA 14 to perform a read operation.

Once the data has been entered into the FIFO 77, the control circuit 73 inspects the state of the FIFCNT lines. If the signal indicates that all but two of the FIFO queue spaces are occupied, the control circuit 73 produces an AHOLD signal which is conducted to the DIBC 21 on the AHOLD signal line. As explained more fully below, after the elapse at two ACLK cycles following production of the AHOLD signal the DIBC 21 is prevented from granting any more ADDRESS bus access requests until at least three queue spaces are available in the FIFO 77. Any MIA is thereby enabled, by producing an AHOLD signal, to restrain the performance of all ADDRESS cycles until the queue in its FIFO circuit is reduced.

In the event that all but two queue spaces of the FIFO 77 are occupied, the positive exit from the decision block 98 is followed, the control circuit 73 raises the AHOLD signal in step 99 until three or more queue spaces are available in the FIFO 77. Once the FIFO 77 is no longer full, the AHOLD signal is disabled, permitting system ADDRESS cycle operations to once again be performed.

The sequence of operations necessary to access the memory array 84 is illustrated in FIG. 7C. The access sequence is initially entered when data is loaded into the access register 76 and the input register 81. This is performed in step 94 if the FIFO is empty and the start access flag is clear. Upon beginning the access sequence with an empty FIFO, the address, data, command and identification data are loaded directly into the access and input registers from the DIB 20 via the latches 70a and b at the rising edge of the ACLK which ends the ADDRESS cycle on the bus. At the same time, the access sequence is started by step 94a. If the access sequence was entered via step 94a, the positive exit from step 101 will be taken. If the access sequence was re-entered because the FIFO was not empty after the previous access, the output of the FIFO is clocked into the access registers on the rising edge of ACLK. When data is entered into the access registers, a read flag is inspected in decision step 103 to determine whether there is a read operation in progress. A read operation is defined by the operational sequence of FIG. 7D and is explained further hereinbelow.

In the event that a read operation is in progress and the next access is a read operation, the access sequence will be suspended until the read operation is completed. If the next memory access is a write operation, the control circuit 73 provides the sequence of MCNT signals necessary to enter the data in the memory location indicated by the address currently residing in the memory access register 76. This is illustrated in step 104.

If, upon the completion of the access operation indicated in step 104, the address command of the operation comprises one of the WRITE commands, the negative exit is taken from the decision block 105 and the FIFCNT signal is again inspected in step 102. Should the FIFO 77 be empty, the positive exit is taken from decision step 102, the access flag is reset, and the access sequence is exited.

In the event that the FIFO 77 is not empty, the negative exit will be taken from decision step 102, the next FIFO entry will be enabled into the memory access and current input registers 76 and 81, and the access sequence will again be performed.

Returning to step 105, in the event that the current access sequence comprises performance of a READ MEMORY command, then MCNT signals which are appropriate to read from the indicated memory location are provided and the positive exit is taken from decision step 105. In access step 106, the appropriate data is entered into the registers 85, 86 and 87, the read flag, inspected in step 103, is set, and the read sequence illustrated in FIG. 7D is performed.

In the read sequence, the control circuit 73 outputs the RREQ signal in step 107 and waits until an RGNT signal is received from the DIBC 21. In read step 108, when the RGNT signal is received, the control circuit provides the MOREN signal during the first ACLK cycle subsequent to receiving the RGNT signal. As explained above, this enables the MIA 14 to drive the READ bus and read command and identification signal lines during the READ cycle.

Figure 8:
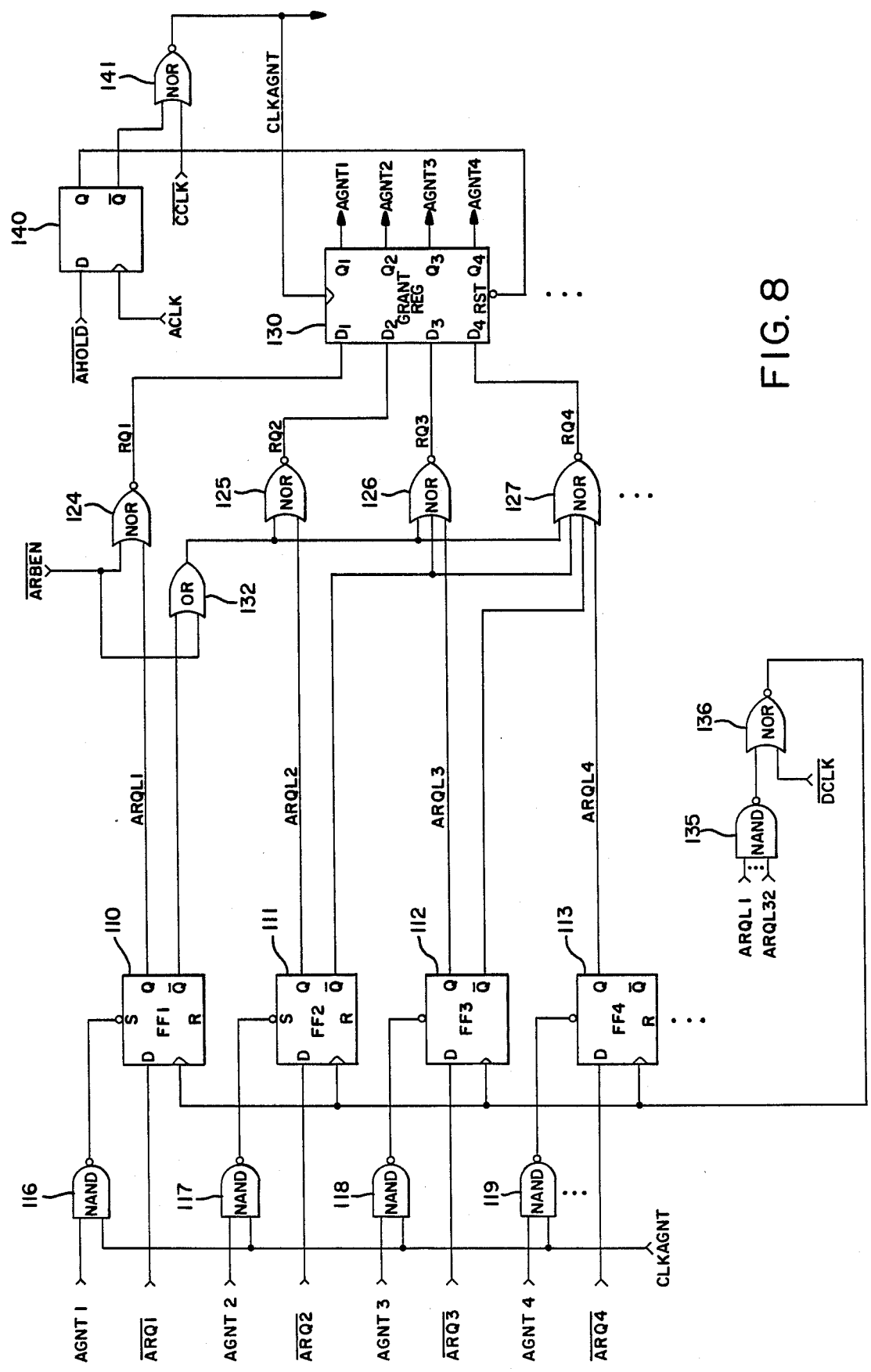
FIG. 8 is a partial circuit diagram of the data interchange bus controller of the invention.

The operation of the DIBC 21 in arbitrating and granting access to the DIB 20 for conducting an ADDRESS cycle will be understood with reference to FIG. 8, which illustrates a DIBC address cycle access grant circuit. In the DIBC 21, the address cycle request (ARQ) line from each DIA is connected to the input of a D flip-flop. Although only four such flip-flops 110–113 are shown for illustration, it is to be understood that as many D flip-flops may be provided in a particular application as may be necessary to read all of the DIA address request lines. Connected to the set terminal S of each flip-flop is a NAND gate, four of which are indicated by 116–119. A clock signal CLKAGNT which is derived from the system CLK signal in a manner described below, is provided as an input to the NAND gates 116–119. In addition, each of these NAND gates has as an input the AGNT signal which is provided to the DIA associated with the D flip-flop to which the NAND gate is connected. Each of four NOR gates 124–127 is connected to receive the Q output of an associated D flip-flop. In addition, an OR gate 132 is connected to receive as an input the $\overline{Q}$ output of the flip-flop 110. Each of the gates 124 and 132 has as an input an $\overline{ARBEN}$ signal which may be generated internally by the DIBC or which may be provided by an external source to enable the DIBC to arbitrate bus request signals. The output of the OR gate 132 is input to all of the NOR gates 10 125–127. In addition, the Q output of the flip-flop 111 is fed to NOR gates 126 and 127. Similarly, the $\overline{Q}$ output of the flip-flop 112 is fed to the NOR gate 127.

The output of each of the NOR gates 124–127 is fed to a respective data input of a clocked grant register 130, the Q output ports of which provide the AGNT signals.

The Q outputs of the flip-flops 110–113 are collected by a NAND circuit 135, the output of which is fed to a NOR gate 136. The DCLK signal is also fed inverted form to the input of the NOR gate 136, the output of which is connected to the clock ports of the flip-flops 110–113.

A D flip-flop 140 is connected to sense the condition of the AHOLD signal line which is connected to all MIA's for the conduction of an $\overline{AHOLD}$ signal. The Q output of the flip-flop 140 is fed to the reset port RST of the grant register 130, while the $\overline{Q}$ port is provided as one input to a NOR gate 141. The NOR gate 141 is also connected to receive the inverted CCLK and to provide the CLKAGNT signal at its output. The CLKAGNT signal, in addition to being fed to the NAND gates 116–119, is also fed to the clock port of the grant register 130.

The flip-flops 110–114 and their associated setting NAND gates 116–119 form a multi-input latch circuit which periodically opens to inspect the condition of the access request lines from the DIAs. When the latch circuit is closed, the requests which have been latched in are arbitrated by the arbitration gating circuit which comprises the gates 125–127 and 132. The arbitration gating circuit acts on the latched WRITE bus access requests and grants them one-by-one according to a priority which is embedded in the circuit comprising NOR gates 124–132 and which is explained below. As each request is granted, it is fed by the arbitration gating circuit to the grant register 130 which synchronizes the granted requests with the system CLK signal and outputs AGNT signals, one-by-one, to all of the DIAs whose requests have been latched into the latching circuit. The AGNT signals are provided in a sequence corresponding to the arbitration priority which is imbedded in the arbitration gating circuit. When all of the latched requests have been granted by production of an associated AGNT signal, another snapshot of request signals is latched and the process is repeated.

Assuming the end of an AGNT signal sequence, all of the outputs of the grant register 130 are initially in a low logic state. Assuming also that an AHOLD signal has not been output by an MIA, the NOR gate 141 outputs the CLKAGNT signal which is combined with a respective AGNT signal in each of the NAND gates 116–119. This initially sets each of the flip-flops 110–113. Setting the flip flops drives the output of the NAND gate 135 negative which will cause the NOR gate 136 to place one DCLK signal transition on the clock ports of the flip-flops. The DCLK transition will cause the flip flops to assume states corresponding to the access request lines which are sensed by their D input ports. Assuming that request signals have been provided to, for example, flip-flops 110 and 112, their outputs will assume conventionally corresponding states. This will drive the ARQL1 and ARQL3 signals negative, thereby disabling the NOR gate 136 from clocking the flip-flops.

The assumption of a low level by the ARQL1 signal will cause the output of the NOR gate 124 to rise, assuming the proper state for the $\overline{ARBEN}$. The positive state of the NOR gate 124 will cause the $Q_1$ output of the gate register 130 to rise with the first available rising edge of CCLK. This provides an AGNT1 signal to the associated DIA.

Returning once more to the arbitration gating circuit, the output of the NOR gate 132 is driven positive by the $\overline{Q}$ output of flip-flop 110. This prevents the provision of a positive signal to any of the other input ports of the gate register 130 thereby keeping all of the other AGNT signals low. When the AGNT1 signal rises, it will combine with the CLKAGNT signal in the NAND gate 116 to set the flip-flop 110, which will cause the NOR gate 124 to remove the positive level from the D1 port of the register 130, as well as driving the output of the NOR gate 132 to a low logic level. The low output of the gate 132 enables to NOR gate 125 to respond to the condition of the ARQL2 signal. However, since no request was received from the associated DIA, the ARQL2 signal remains high leaving the output of the NOR gate 125 low. Simultaneously, the output of the NOR gate 126 is driven to a high logic level by virtue of the presence of low logic levels from the outputs of the NOR gate 132, the Q output of flip-flop 111, and the state of the ARQL3 signal provided by the flip-flop 112. This enables the register 130 to provide an AGNT3 signal at the next rising CCLK edge following provision of the AGNT1 signal. Following this, the output of the flip flop 112 in reset by the NAND gate 118, and the output of the NAND gate 135 is driven to a high logic state by the condition of the ARQL signal on its input. This enables the latching circuit to once again sense the condition of the request lines.

It should be evident without further explanation that the arbitration priority imposed by the illustrated arbitration gating circuit is a linearly hierarchical one. (As a matter of design choice, other priority orders may be embedded in the arbitration circuit). However, the periodic latching of the request line followed by the successive granting of all latched requests ensures that access requests from DIAs having lower priorities will not be continuously postponed by successive requests from one or more higher-ranked DIAs. The net effect is that all DIA's have equal access to the DIB 20.

The operations of the grant register 130 and the flip-flops 110-113 are inhibited by the provision of an $\overline{\text{AHOLD}}$ signal to the input of the D flip-flop 140. A negative level at this input will cause the flip-flop to assume a corresponding state at the first rising edge of a ACLK following the provision of the $\overline{\text{AHOLD}}$ signal. This will prevent the grant register 130 operating by keeping a logic low level on its reset port, and by inhibiting the CLKAGNT signal from reaching its clock port. The signal on the reset port will drive all of the AGNT signals low, preventing any DIA from being granted access to the DIB. Further, the low state of the AGNT signals prevent the NAND gates 116-119 from clearing any requests which have already been latched.

When the $\overline{\text{AHOLD}}$ signal drops, indicating that the overloaded MIA has reduced the number of entries in its FIFO, the address grant circuit of the DIBC 21 will recommence operation.

The reason for providing the $\overline{\text{AHOLD}}$ signal when an FIFO queue is two spaces from being full may now be understood. The $\overline{\text{AHOLD}}$ is raised at the beginning of the ACLK period following that in which the critical count was reached for the FIFO queue. However, the $\overline{\text{AHOLD}}$ signal is not clocked into the flip-flop 140 until the ACLK cycle, following that in which it was raised. This allows two ADDRESS cycles to elapse before ADDRESS cycle operations are inhibited, raising the possibility of filling the last two queue spaces.

The inhibition of the address cycle request circuit upon the provision of an $\overline{\text{AHOLD}}$ signal permits an over-burdened MIA to relieve itself of a portion of the load of accumulated memory access requests by inhibiting the ADDRESS cycle operations. However, since $\overline{\text{AHOLD}}$ does not inhibit READ cycle operations, system data transfer is continued. This permits the operation of the system of the invention to be paced by the capability of its memory to perform data storage and retrieval.

The DIBC 21 also comprises a read cycle access grant circuit, not shown, which arbitrates and grants READ bus access requests by means of circuitry which corresponds in all essential respects with the circuitry shown in FIG. 8. However, as there is no need in READ cycle operations for provision of a function corresponding to that of the $\overline{\text{AHOLD}}$ signal (because the DIAs illustrated and explained above have no FIFO means for accumulating successive operations) none is provided. However, this is not intended as a limitation and it should be evident to one skilled in the art that a DIA may be provided with a FIFO circuit of conventional design which performs in a manner corresponding to FIFO of the MIAs of the system.

Figure 9:
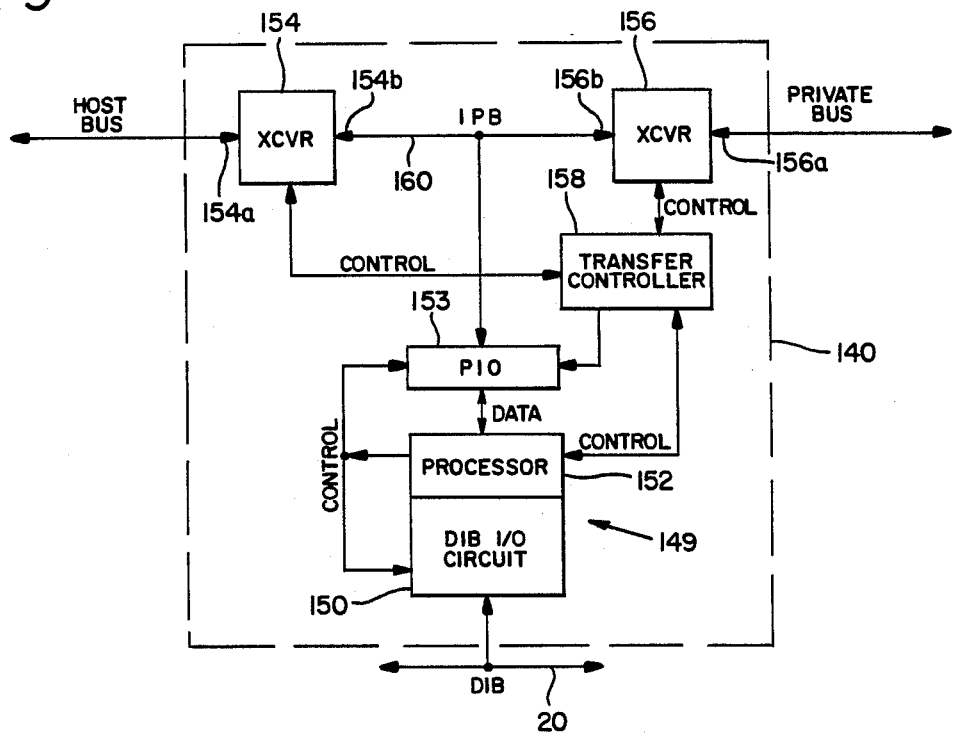
FIG. 9 is a block diagram illustrating a second embodiment of the data interchange adapter of the invention.

A second embodiment of the data interchange adapter (DIA) of the data transfer system of the invention is illustrated in FIG. 9. In its second embodiment, the DIA is indicated by 140 and comprises a DIB interface, indicated generally by 149, which has the structure and functions of the DIA 10 illustrated in FIGS. 4-6B and described hereinabove. The DIB interface circuit 149 comprises a DIB I/O circuit 150 including the input and read/write control circuits and the address, read, write and control registers illustrated in FIG. 4. The DIB interface 149 also includes a processor 152, corresponding to the processor 24 of FIG. 4. The DIB interface is connected to a DIB 20 which corresponds to the identically-numbered data interchange bus described above. The interconnection between the DIB I/O circuit 150 and the DIB 20 is termed the "DIB" port of the DIA 140. The processor 152 provides address, data and control signals necessary to allow the DIB I/O circuit 150 to transfer data between the processor 152 and the DIB 20 in the manner disclosed hereinabove. In addition, a processor input/output (PIO) circuit 153, under the control of the processor 152 and a transfer controller, is coupled to the processor 152 to provide a data staging interface between the processor 152 and two bidirectional transceiver circuits 154 and 156. The transceiver 154 has throughput ports 154a and b, with port 154a being designated as the "HOST" port of the DIA 140. Similarly port 156a of transceiver 156 is designated as the "PRIVATE" port of the DIA. An internal private bus (IPB) 160 is connected to transfer data between transceiver ports 154b and 156b, respectively, and the PIO 153.

A transfer controller 158 responds to system address and control signals flowing through the three DIA ports to establish a data path between any one two of the ports by selectively providing DIA control signals to the transceivers 154 and 156, to the processor 152 and to the PIO 153. The DIA control signals are appropriate for establishing a transmitting path between any two of the three devices over the IPB. This is accomplished, for example, by gating the two transceivers 154 and 156 to transmit in the same direction, while inactivating the PIO 153. This enables bidirectional communications to be established between the HOST and PRIVATE ports through the two transceivers and over the IPB 160. Alternatively, the PIO 153 can be enabled together with either of the transceivers to establish a bidirectional path therebetween over the IPB 160 which will allow data to flow between the DIB port and either of the other two ports.

With the construction illustrated in FIG. 9, the second embodiment of the DIA 140 provides a three-port node which can selectively establish bidirectional transmisivity between any two of the three ports on a word-by-word basis. The means and technique of selection one described in greater detail hereinbelow. This embodiment of the DIA enables the system of FIG. 1 to be operated in association with another data bus system, as is illustrated in FIG. 10.

Figure 10:
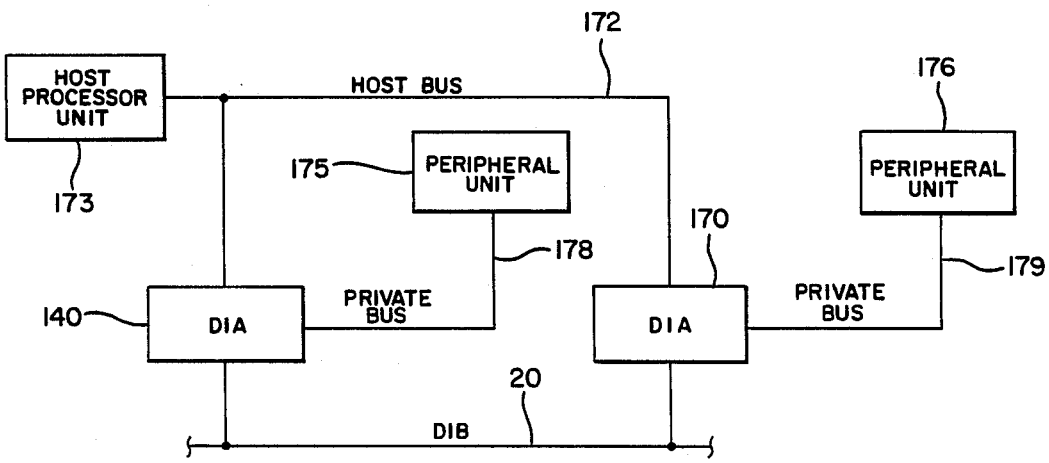
FIG. 10 is a block diagram illustrating an application of the second embodiment of the data interchange adapter illustrated in FIG. 9.

In FIG. 10 a pair of DIAs 140 and 170, each of which correspond to the second embodiment of the DIA illustrated in FIG. 9, are connected through their DIB ports to a DIB 20 which corresponds in all respects to the identically-numbered DIB illustrated and explained hereinabove. In addition, each DIA is connected through its HOST port to a host data bus 172 which may comprise any of a variety of known structures. A host processor unit 173 is connected to the host bus to conduct data transfers thereover. Finally, each DIA is connected through its PRIVATE port to a peripheral unit, two of which are indicated by 175 and 177. The connections between the peripheral units 175 and 177 and their associated DIA's comprise private busses 178 and 179. Each private bus conforms in all respects to the host bus 172 with the sole exception of having no host processor unit attached to it. Therefore, data transfers on the host and private buses are subject to the same protocol and control mechanization. The peripheral units 175 and 177 comprise bus interface and control circuitry appropriate to conduct communications over the host bus 172 and thus also over the private busses 178 and 179.

The host bus 172 may constitute part of a conventional data processing system which also includes the host computer 173 and the peripheral devices 175 and 177. An exemplary data processing system which is useful for purposes of illustrating the operation of the DIA 140 is described in Cohen et al, U.S. Pat. No. 3,710,324, which is incorporated herein by reference. It is to be understood that whenever the terms "host processor unit," "host bus," "peripheral unit," or other terms relating to the structures or function thereof, are used hereinbelow, they are intended to invoke corresponding and related terms in the reference patent.

Figure 11:
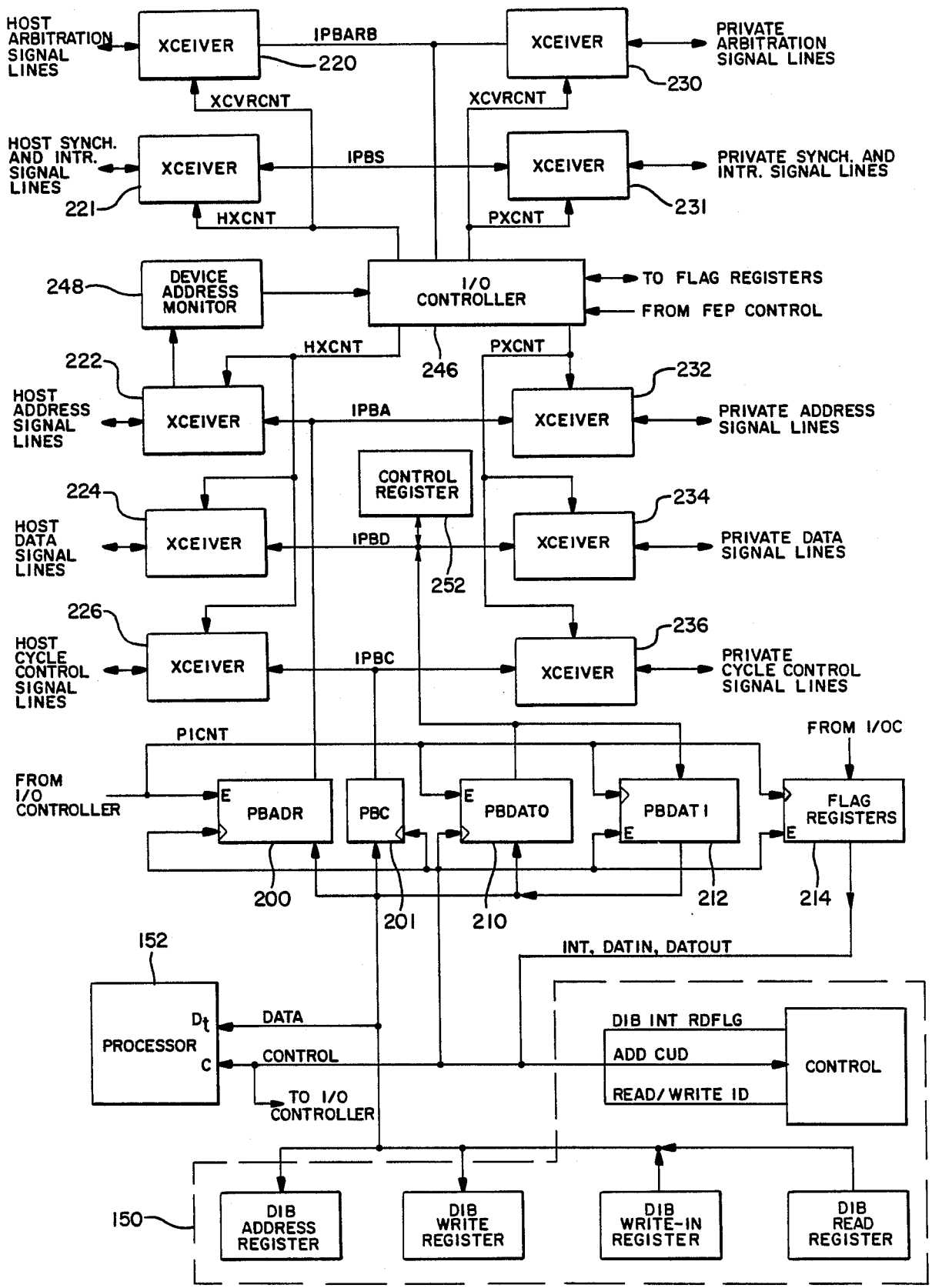
FIG. 11 is a detailed block diagram illustrating in greater detail the structure of the second embodiment of the data interchange adapter illustrated in FIG. 9.

The DIA 140 permits data transfers to be carried out between its associated peripheral unit 175 and another host bus device, or between the peripheral unit and any other DIA or MIA attached to the DIB 20. It also enables the host processor unit 173 to transfer data to either the peripheral unit 175 or any other DIA or MIA attached to the DIB 20. Finally, the DIA 140 permits other interchange adapters on the DIB 20 to transfer data either to the host processor unit 173 or to the peripheral unit 175. Reference to FIGS. 11–13 will provide an understanding of how the DIA 140 selectively establishes a data transfer path between any two of its ports.

As illustrated in FIG. 11, the registers of the DIB I/O circuit 150 are coupled to a common bidirectional data interface which links them with the data throughput ($D_t$) port of the processor 152 in order to receive address signals from, and exchange data signals with the processor. In addition the control circuits of the DIB I/O circuit are linked to the control port C of the processor 152 in order to transfer signals appropriate for controlling the above described data transfers on the DIB 20.

The D and C ports of the processor 152 are also coupled to the PIO 153. The PIO 153 comprises an address register (PBADR) 200 which is connected to receive address data from the $D_t$ port of processor 152 and to place those signals onto the IPBA lines of the IPB 160. A control register (PBC) 201 holds cycle control data indicating whether a data transfer is to be a write or read operation, as those terms are used with reference to the cycle control lines of the host bus. In addition, an output data register (PBDATO) 210 and an input data register (PBDATI) 212 are coupled to transfer data out of and into the $D_t$ port of the processor 152 and onto and off of the IPBD lines of IBP 160. Finally, the PIO 153 includes a flag register 214 which stages synchronization signals between elements of the transfer controller 158 and the C port of the processor 152.

The processor 152 may comprise, for example, a bit-slice array circuit with associated logic, control, interface and programmable memory circuitry. Such devices are well known, the Advanced Micro Devices 2901 being one example. Those familiar with them will understand that bit-slice microprocessors combine a very rapid computing capability with a selectibly variable word size which provide the speed and variable capacity necessary to quickly load one or more registers of the PIO 153 or the DIB interface 150 under the control of a program residing in the microprocessor.

The transceiver 154 includes five separate transceiver circuits 220–226, each attached to one or more groups of signal paths on the host bus. Transceivers 220 and 221 are coupled to host bus control signal lines. The transceiver 220 is coupled through the HOST throughput port of the DIA to host bus control signal lines which conduct arbitration signals. For example, these control signals may comprise BUS REQUEST, BUS GRANT, NON-PROCESSOR REQUEST, NONPROCESSOR GRANT, SELECTION ACKNOWLEDGMENT, and BUSY, signals which are described in the referenced patent. One port of the transceiver circuit 221 is connected to the control signal lines of the host bus which may carry MASTER and SLAVE SYNCHRONIZATION handshake signals and INTERRUPT signals. One port of the transceiver 222 is coupled to the ADDRESS signal wires of the host bus. The corresponding port of the transceiver 224 is coupled to the group of wires in the host bus which conducts DATA signals. Finally, the transceiver 226 is connected at one port to the CYCLE CONTROL group of control wires on the host bus. These transceiver ports can respond to the HOST port of the DIA 140.

The transceiver circuit 156 includes a group of transceivers 230–236 which correspond to the transceivers 220–226, respectively. Thus, the ports of the transceivers 230–236 which correspond to the PRIVATE port of the DIA 140 are connected to transfer arbitration, handshake, address, data, and control signals, respectively, to and from the peripheral unit 175 over the private bus 178.

Figure 12A:
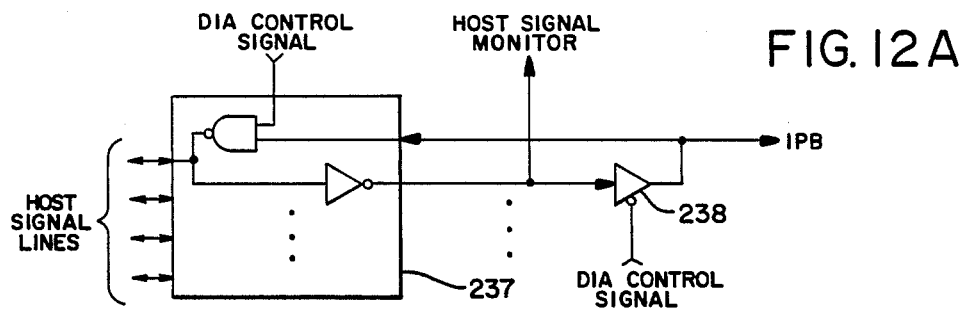
FIGS. 12A and 12B are circuit diagrams illustrating transceiver circuits which are used in the second embodiment data interchange adapter to interface a data bus with the adapter.
Figure 13:
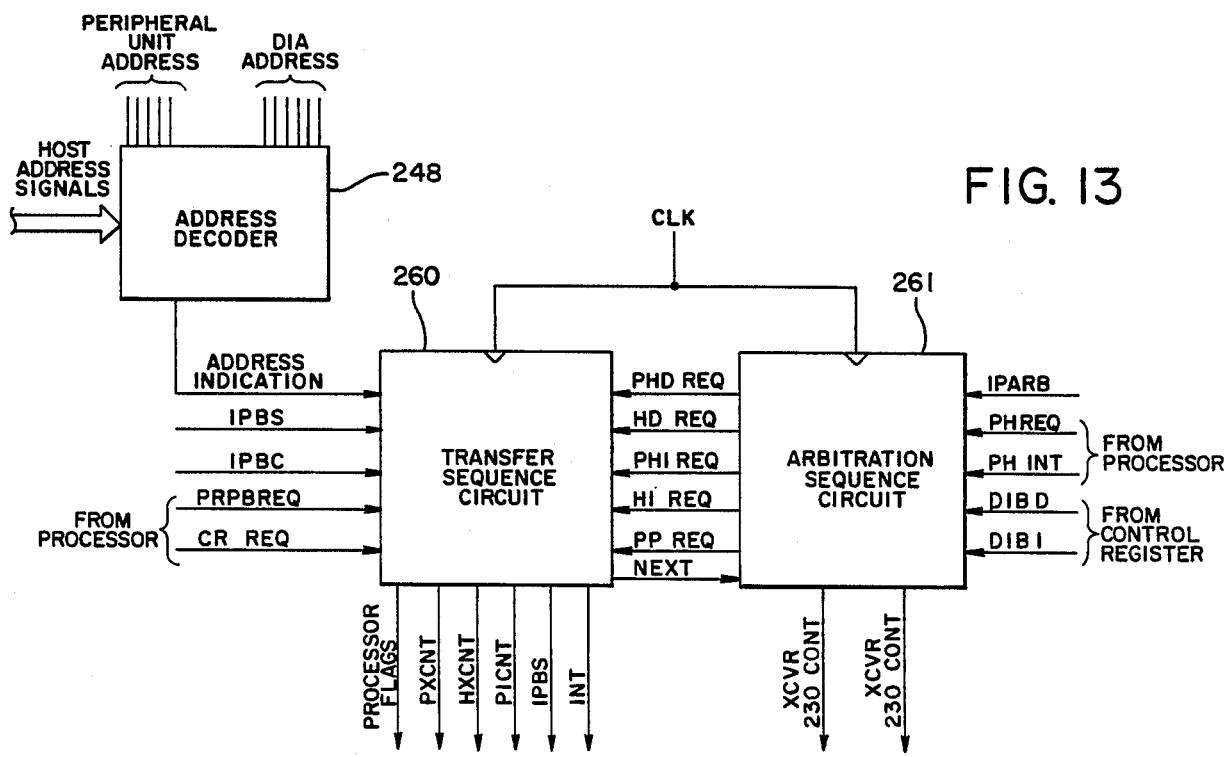
FIG. 13 is a block diagram illustrating the components of a transfer controller used in the embodiment of the data interchange adapter illustrated in FIG. 11.

Details of the transceiver circuits are illustrated in FIGS. 12A and B. FIG. 12A illustrates a transceiver as may be used in the transceiver circuits 222–226 to couple host bus signal lines to IPB signal lines. The transceiver may comprise a standard 8641 device 237, with an external associated gate 238. The lines marked "DIA CONTROL SIGNALS" permit the transceiver to be gated to transfer signals received on the conductors marked "HOST SIGNAL LINES" to those marked "IPB," or gated to transfer signals in the opposite direction. In addition, even with the gate 238 enabled to isolate the transceiver device 237 from the IPB signal lines, the host lines may be monitored for incoming signals on the transceiver line marked "HOST SIGNAL MONITOR." Those skilled in the art will realize that the FIG. 12A transceiver may also be used in transceiver circuits 232–236 to interface private bus and IPB address, data and control lines.

Figure 12B:
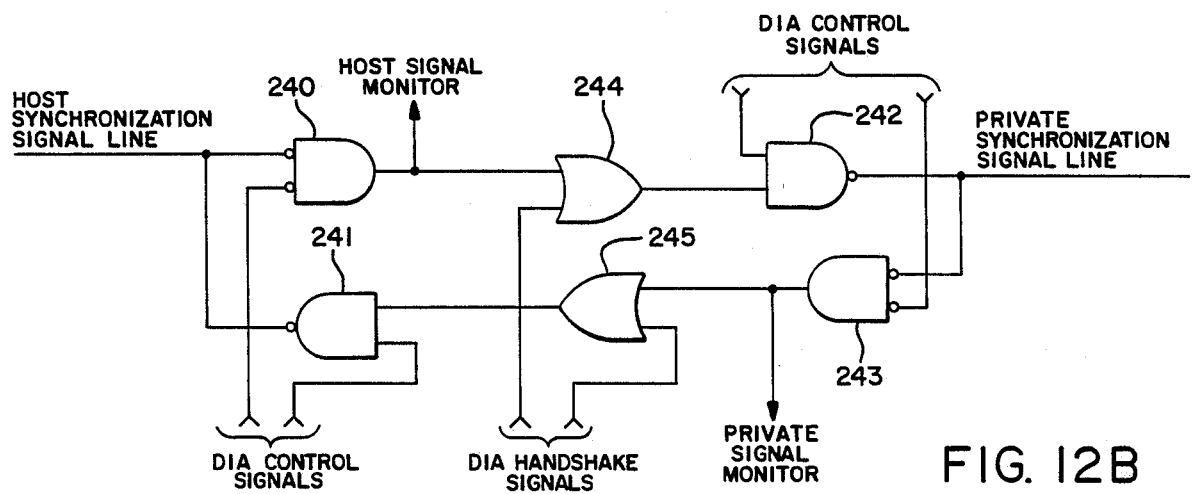

The transceiver circuits 220, 221, 230 and 231 comprise gated, two-way signal interchanges, one example of which is illustrated in FIG. 12B. The two gates 240 and 241 may comprise one two-way gate of the transceiver 220, for example, while the two gates 242 and 243 may comprise a two-way gate of transceiver 230. Both sets of gates are enabled to block transmission or to allow signals to be transferred in one direction or the other under the control of signals on the DIA CONTROL signal lines. The gates 244 and 245 permit signals to be injected onto either the host or private bus, respectively, from within the DIA 140. For example, with gates 240, 241 and 243 closed, and gate 242 open, a handshake signal may be injected from DIA circuitry onto a private bus SYNCHRONIZATION signal line through the gates 244 and 242. In addition, the host or private synchronization line may be monitored on the lines labelled HOST and PRIVATE SIGNAL MONITOR, respectively.

Included in the transfer controller 158 are an input/output (I/O) controller 246 and a device address monitor 248. The I/O controller 246 is connected to monitor and inject signals onto the bidirectionally-conducting signal lines which extend between the transceivers 220 and 230, and the transceivers 221 and 231. These lines are labelled IPBARB and IPBS, respectively, to denote arbitration and synchronization signal paths. The I/O controller is also connected to provide signals suitable for gating the transceiver circuits and the registers of the PIO 153. The host port transceiver circuits are controlled by DIA control signals on lines HXCNT, while the private port transceivers are controlled on lines PXCNT. The lines PICNT carry PIO gating signals.

The device address monitor 248 is connected through transceiver circuit 222 to monitor signals on the host bus ADDRESS signal lines and to provide a set of signals to the I/O controller 246 which indicate when either the DIA 140 or the peripheral unit 175 are addressed by a unit attached to the host bus.

The IPB 160 includes an address bus, IPBA, which interconnects throughput ports of the transceivers 222 and 232 and the output ports of the PBADR register 200. An internal private data bus, IPBD, interconnects throughput ports of the transceivers 224 and 234, while the internal private control bus IPBC couples throughput ports of transceiver circuits 226 and 236. As explained above, the transceiver circuits 220 and 230 are connected by a line IPARB (internal private arbitration bus) while circuits 221 and 231 are linked by an internal private synchronization bus, IPBS. The I/O controller 246 is connected to both monitor and place signals on the IPBARB and IPBS.

The structure illustrated in FIG. 11 permits the I/O controller 246 to enable the transceiver circuit pairs 220 and 230, and 221 and 231 to transfer host bus handshake and arbitration signals between the HOST and PRIVATE ports. In addition, it allows the transceivers 222-226 and 232-236 and the registers of the PIO interface 153 to be activated by the controller in any combination required to pass data between any two ports of the DIA 140.

A control register 252 is coupled to IPBD to receive data thereon from either the host bus or the processor 152. The control register comprises two control bits, DIBD and DIBI (which serve a purpose described later), which are written in by either the host processor 173 or the processor 152 to control data exchanges involving the peripheral unit 175 as described hereinbelow. The I/O controller 246 also synchronizes the operation of the control register 252 in such a manner as to allow its contents to be inspected or altered by either the processor 152 or the host processing unit 173.

The operation of the DIA 140, and more particularly the synchronizing operations of the transfer controller 158 may be understood by referring to FIGS. 11, 12A and B, and 13. FIG. 13 illustrates, in greater detail, the device address monitor 248 and the I/O controller 246. The address monitor may comprise, for example, a programmable logic array device which monitors signals on the host ADDRESS signal line. Also provided as inputs to the address monitor 248 are codes representing the addresses of the DIA 140 and the peripheral unit 175. In this embodiment of the DIA, the address monitor 248 is able to distinguish between DIA addresses which are directed to the PIO 153 or to the control register 252. The peripheral unit 175 and DIA addresses may be provided from, for example, an array of microswitches, not shown. In response to the recognition of either a peripheral unit 175 or DIA 140 internal device address, the address monitor 248 provides a set of coded signals which indicate to the I/O controller 246 that a unit on the host bus has addressed either the peripheral unit, the PIO 153, or the control register 252.

As should be apparent to those skilled in the art, the processor unit 173 may be programmed in the manner described in the referenced patent to address the control register 252 and the PIO 153 and to conduct data transfers with them under the control of the host bus system protocol.

The I/O controller 246 includes a data transfer sequence circuit 260 and an arbitration sequence circuit 261. Both the transfer and the arbitration sequence circuits 260 and 261 may comprise, for example, one or more registered, programmable logic arrays which are synchronized by the CLK signal, corresponding in all respects, to the CLK signal described hereinabove.

The transfer sequence circuit 260 may be programmed to monitor IPBS and IPBC and to inspect and appropriately respond to signals present thereon. It produces SYNCHRONIZATION signals necessary for handshaking with devices on the host and private buses. These are injected onto IPBS as needed. It also produces signals for setting an interrupt (INTR) and data-in (DATIN) flag bits in the flag register 214.

The transfer sequence circuit 260 is connected to receive the indication signals provided by the device address monitor 248. When the signals indicate that the peripheral unit 175 has been addressed, the transfer sequencer 260 outputs control signals on the lines HXCNT and PXCNT directed to the transceivers 220-226 and 230-236 to enable handshake, address, data, and control signals to pass from the host bus, through the transceivers of the transceiver circuit 154, across the IPB 160, through the transceivers of the transceiver circuit 156, and therefrom onto the private bus 178. After a period of time sufficient to allow the passage of host bus signals from the HOST to the PRIVATE ports of the DIA 140, the transfer sequence circuit 260 sends control signals to the transceivers 221 and 231 appropriate to change the direction of their transmissivities so that a SLAVE handshake signal may be passed from the peripheral unit 175, through the PRIVATE and HOST ports, and onto the host bus 172. The transfer sequence circuit 260 also monitors the IPBC to determine whether a signal indicating that the data transfer constitutes a read operation is present, which would require a data transfer from the peripheral unit 175 to the host bus 172. If the transfer comprises a read operation, the transfer sequence circuit 260 reverses the transmissivity between the transceiver circuits 156 and 154 to permit data signals to be transferred from the peripheral unit 175 to the host bus 172. The transfer sequence circuit 260 monitors the exchange of MASTER and SLAVE SYNCHRONIZATION signals through the IPBS between the host bus and the peripheral unit, appropriately switching transceiver circuits 221 and 231 to pass these signals on in the IPBS. When the transfer cycle is complete, the transfer sequence circuit enters a waiting state, during which it disables transceivers 221-226 and waits for the next transfer request.

When the address monitor 248 indicates that the address of the PIO 153 or the control register 252 is on the host ADDRESS signal lines, the transfer sequence circuit 260 provides control signals enabling the transceivers 222-226 to transfer address, data, and control signals onto the IPBA, IPBD, and IPBC, respectively. If the PIO 153 is addressed, and the condition of the IPBC, to which the transfer sequence circuit 260 is connected, indicates a write operation, the sequence circuit outputs an appropriate signal on the PICNT lines, allowing the PBDATI register 212 to read IPBD. Simultaneously, a DATIN flag signal is produced by the sequence circuit 260 which sets the appropriate processor flag in the flag registers 214. This flag enables the processor 152 to interrupt its program in a manner which may be determined by the requirements of the system design. For example, the processor may be programmed to transfer all data received in the PBDATI register to a predetermined block of storage addresses reached through a particular MIA coupled to the DIB 20. To accomplish this, the processor may be programmed to execute a series of instructions which will produce control signals for transferring the data to the write register of the DIB interface circuit 150 and will cause the processor 152 to provide the address, STDIB, address command, and address identification signals necessary to transfer the data from the DIB I/O circuit 150 to the destination MIA. In this mode of operation, the DIA 140 provides access to DIB system memory facilities for the host system. Alternatively, the processor 152 may be expecting data from a host bus device to which it transferred data or an instruction during a previous data transfer operation. In this case, based upon the program residing in the processor, the data may be either transferred elsewhere on the DIB 20 through the DIB I/O circuit 150, or the processor 152 may acquire data from another DIB unit to be transferred to a host unit in a data transfer.

If the transfer initiated by the host bus device is a read operation requiring information to be transferred out of the PBDATO register 210, the transfer sequence circuit 260 switches the transmission direction of the transceiver 224 so that data on the IPBD is coupled onto the host data bus. At the same time, the sequence circuit 260 provides an enabling signal to the PBDATO register 210 on the PICNT signal lines, which gates information stored therein onto the IPBD. The transfer circuit 260 then generate the appropriate SYNCHRONIZATION signal which is coupled onto the IPBS whence it exits through the transceiver 221 onto the host bus SYNCHRONIZATION signal lines. The transfer sequencer 260 monitors the synchronization signals until the transfer cycle is complete, following which it enters the wait state.

The processor 152 may be appropriately programmed to execute an instruction set so that it may initiate data transfers to or from the peripheral unit 175. Using these instructions together with instructions appropriate for transferring data over the DIB 20, the program of the processor may be useful for causing data to be transferred between the DIB 20 and either the host or private buses.

For example, data may be transferred under control of the processor program to the DIB interface registers by a DIB READ cycle operation. Then the processor 152 will cause the data to be moved to the PBDATO register 210. At the same time, the processor will enter address and control information into the PBADR register 200 and the PBC register 201. Since data transfers on the private bus 178 are carried out according to host bus protocol, the address and control information will be appropriate to the host bus signal format. Thus, the address will be the peripheral unit's address and the control information will define a host bus write operation. When data has been staged into the PIO 153, the processor will provide a signal to the I/O controller 158 indicating the type of transfer which is to be conducted with the peripheral unit 175. At this point, the I/O controller 158 assumes control of the data transfer operation as described below.

Similarly, the program of the processor 152 may be written to cause the processor to stage data into and out of the PIO registers and to exchange control signals with the I/O controller 158 which are appropriate to indicate the type of data transfer to be conducted on the host or private bus and to synchronize the staging and transfer operations.

To initiate a transfer over the private bus, the processor 152 provides an appropriate processor to-private-bus request signal (PRPB REQ) to the transfer sequence circuit 260 requesting access to the private bus 178 for transfer of data to the peripheral unit 175. At the same time, the processor will load up data to be transferred into the PBDATO register 210, and address and control data into the PBAD register 200 and the PBC register 201, respectively. When the transfer sequence circuit 260 detects the PRPB REQ signal, it provides enabling signals to the PBDATO register 210, to the PBAD register 200, and to the PBC register 201, in response to which contents of the registers are placed on the associated IPB's. At the same time, the transceivers 232-236 are placed in a state to transfer data onto the private bus from the IPB 160 and a sequence circuit places a MASTER SYNCHRONIZATION signal on the IPBS to be fed to the private bus.

If the transfer sequencer 260 detect from the signals on the IPBC that the operation is a private bus read operation, it switches the transmission direction of the transceiver 234. When the sequence circuit 160 detects the handshake from the peripheral unit 175 it drops its SYNCHRONIZATION signal and, if the transfer operation is a private bus read operation, it enables the data on the IPB 160 to be clocked into the PBDATI register 212. When the SYNCHRONIZATION signal from the peripheral unit 175 is dropped, the sequence circuit 160 disables all transceivers and returns to the waiting state.

To transfer information to the control register 252, the processor 152 provides a control register request (CR REQ) signal from its C port to the transfer sequence circuit 260 and enters host CYCLE CONTROL information into the PBC register 201 indicating a write or read operation. If information is to be transferred to the control register 252, the processor enters the data into the PBDATO register 210. Then the transfer sequence circuit 260 strobes the data from the register 210 over the IPBD and into the control register 252. If data is to be transferred from the control register 252, the PBDATO register 210 is disabled, and the control register 252 is enabled onto IPBD and the PBDATI register 212 is strobed by the sequence circuit 260 to allow the data to be entered into the PBDATI register 212 over the IPBD. Thereafter, the sequence circuit returns to the waiting state.

All other data transfers through the DIA 140 require arbitration of either the host bus 172 or the private bus. Consequently, the arbitration sequence circuit 261 is programmed to monitor host system arbitration signals on IPARB and to respond to those signals by providing transfer phasing signals to the transfer sequence circuit 260 indicating the completion of an arbitration sequence. The arbitration sequence circuit 261 is also programmed to produce arbitration signals, as needed, when the arbitration involves a transfer from the processor 152 to a host bus device or to engage in a mock arbitration with the peripheral unit 175 by emulating the arbitration unit in the host processing unit 173. In the referenced patent, the arbitration signals include BUS REQUEST, BUS GRANT, NON-PROCESSOR REQUEST, NON-PROCESSOR GRANT, SELECTION ACKNOWLEDGMENT, and BUSY. In the case where a sequence of arbitration signals is to be exchanged between the host bus and the peripheral unit 175, the arbitration sequence circuit 261 passively monitors those signals and produces control signals XCVRCNT 220 and 230, which establish the proper transmission direction for the passage of those signals in the transceiver circuits 220 and 230. When the arbitration circuit is in a waiting state, it monitors the private bus request signal lines, but disables transceiver circuit 220 to prevent the signals being placed on the host bus 172.

Thus, when the peripheral unit 175 generates a request for control of the private bus 172 for a data transfer, the arbitration sequence circuit 261 detects a private bus request (PBDRQ) on the IPARB lines. If the DIBD bit in the control register 252 is reset, the arbitration sequence circuit 261 provides control signals to the transceivers 220 and 230 which are appropriate to allow arbitration between the peripheral unit 175 and the host bus to proceed. When the arbitration sequence circuit 261 detects that control of the host bus has been granted to the peripheral unit 175, it provides a private-bus-to-host data request (PHD REQ) signal to the transfer sequence circuit 260. The transfer sequence circuit 260 then controls the transceiver circuits 222-226 and 232-236 as appropriate to pass address, data, and control signals between the peripheral unit 175 and the host bus 172 and it provides a phasing signal NEXT to the arbitration sequence 261 indicating that it is starting the transfer cycle of the arbitration-initiated operation. This allows the arbitration sequence circuit to start the next arbitration sequence if any is requested. The transfer sequence circuit 260 also enables the transceiver circuits 221 and 231 to allow the appropriate sequence of SYNCHRONIZATION signals to pass between the peripheral unit 175 and the host bus 172. If the data transfer constitutes a read operation, the transceivers 224 and 234 are appropriately enabled to pass data from the host bus 172 over the IPB to the peripheral unit 175. When the transfer sequencer 260 detects from the SYNCHRONIZATION signals that the transfer is complete it returns to the waiting state.

In the event that the peripheral unit 175 places an interrupt request (PBIRQ) on the private bus, the arbitration sequence circuit 261 detects the request on the IPARB lines, and, if the DIBI bit is reset in the control register 252, enables the transceivers 220 and 230 to pass the related arbitration signals between the peripheral unit 175 and the host bus 172. When the arbitration sequence circuit 240 detects that the arbitration sequence is complete, it provides a private-bus-to-host interrupt request (PHI REQ) to the transfer sequence circuit 260. The transfer sequence circuit responds to the PHI REQ by appropriately enabling the transceivers 221-226 and 231-236 to pass data between the host bus 172 and the private bus and produces a NEXT signal. The transfer sequence circuit 260 monitors the SYNCHRONIZATION signals until the transfer is complete and then assumes a ready state waiting for the next request.

When data is to be transferred from the processor 152 to the host bus 172, the processor provides from its C port a processor-to-host data request (PH REQ) signal requesting the arbitration sequence circuit 261 to acquire control of the host bus for the purpose of transferring data. The arbitration sequence circuit provides the appropriate host bus request through the transceiver circuit 220 onto the host bus 172 and responds appropriately to the arbitration signals which are returned on the host bus 172. When control of the host bus 172 has been granted, the arbitration sequence circuit 261 provides a host data request (HD REQ) signal to the transfer sequence circuit 260 in response to which the transfer sequence circuit 260 provides appropriate control signals to the PBADR register 200, PBC register 201, PBDATO data register 210, and transceivers 222-226 to enable the contents of the registers to be coupled onto the host bus 172 and provides a NEXT signal to the arbitration circuit 261. The transfer circuit 260 also exchanges the SYNCHRONIZATION signals with the host bus through the transceiver circuit 221. Should the data transfer entail a host bus read operation, the transfer sequence circuit appropriately controls the transceiver 224 to pass data from the host bus 172 onto the IPB 160. When the response SYNCHRONIZATION signal is received from the host bus 172, the transfer sequence circuit 260 disables its SYNCHRONIZATION signal and, if the operation is a read operation, strobes the data into the PBDATI register 212. Thereafter, the transfer sequence circuit 260 assumes a ready state while waiting for the next request.

When the processor 152 provides a processor-to-host interrupt (PH INT) request signal through its C port to the arbitration sequence circuit 261, the arbitration circuit performs the required arbitration sequence with the host processing unit 173 and, when the sequence is complete, transmits a processor-to-host interrupt (HI REQ) request signal to the transfer sequence circuit 260. The transfer sequence circuit 260 operates appropriately to couple the contents of the PBDATO register over the IPB 160 onto the host bus 172 and perform the required SYNCHRONIZATION sequence over the host bus 172 and provides the NEXT signal to the arbitration sequence circuit 261. When the response SYNCHRONIZATION signal is received from the host processor unit 173, the transfer sequence circuit 260 once again assumes a wait state.

When the peripheral unit 175 places a host bus request signal on the private bus and the DIBD bit is set in the control register 252, the arbitration sequence circuit 261 performs the required arbitration sequence with the peripheral unit, thus emulating the arbitrator function normally performed by the host processing unit 173. When the arbitration sequence is complete, a peripheral-to-processor (PP REQ) request signal is provided by the arbitration sequence circuit 261 to the transfer sequence circuit 260. The transfer sequence circuit 260 then provides control signals to the transceivers 232–236 which are appropriate to couple address, data, and control information from the private bus onto the IPB 160 and provides the NEXT signal to the arbitration sequence circuit 240. When the transfer sequence circuit 260 receives the SYNCHRONIZATION signal from the peripheral unit 175, the circuit 260 either strobes the data into the PBDATI register 212, or switches the transceiver control signal to enable the contents of the PBDATO register 210 to pass along the IPB 160 onto the private bus if a read cycle is indicated. The transfer sequence circuit 260 then completes the synchronization exchange with the peripheral unit 175 and returns to the ready state.

Finally, when the arbitration sequence circuit 261 detects an interrupt request from the peripheral-unit 175 and the DIBI bit is set in the control register 252, the arbitration sequence circuit again emulates the arbitrator circuit of the host processor unit 173 and performs an arbitration sequence with the peripheral unit 175. When the arbitration sequence is complete, the sequence circuit 261 passes a private (PP REQ) signal to the transfer sequence circuit 260. In response to the request, the transfer sequence circuit 260 enables the data on the private bus to be transferred onto the IPB 160, provides the NEXT signal to the arbitration sequence circuit 261, and strobes the PBDATI register 212 to capture the data on the IPBD and sets the interrupt flag in register 214. At the same time, the transfer sequence circuit 260 provides a response SYNCHRONIZATION signal to the peripheral unit 175 through the transceiver circuit 231. When the SYNCHRONIZATION sequence is complete, the transfer sequence circuit 260 returns all of its control transceivers to an open state and assumes the ready state.

With the interrupt flag set, the processor 152 is informed of the arrival of data from the peripheral unit under a private bus interrupt condition, in response to which the processor may be programmed to take any desired action with the data delivered.

It should be evident to one skilled in the art that, in its second embodiment, the data interchange adapter of the invention provides the means by which an existing host data processing system may be coupled to the data transfer system of the invention which is illustrated in FIG. 1 and described hereinabove. This can provide the existing data transfer system with, for example, access to an added memory capability on the DIB 20 which will expand the processing capability of the host system.

In addition, the memory access efficiency of the existing host system can be increased by deflecting peripheral unit bus access requests from the host bus through the DIA to the MIA attached to the DIB 20. This can be done, for example, by having the host processor unit 173 write a series of instructions to the processor 152 which effectively program it to intercept the bus requests and interrupts from the peripheral unit 175 under certain conditions which can be defined by manipulation of the data in the control register 252. For example, the host processor unit 173 may set the DIBD bit in the control register 252, and then provide a command to the processor 152 through the registers in the PIO 153 which will cause the processor to store all data transferred into the DIA by the peripheral unit in a particular block of memory locations. In this manner, if the peripheral unit comprises, for instance, an analog-to-digital converter in an industrial system, its output can be staged into a DIB MIA until the host processor 173, by another command causes the data to be sent to a peripheral processor (such as an array processor) or storage device attached to another DIA. This will relieve the host processor unit 173 of the burden of transferring the data and the low level control of the data transfers.

It will be evident to those skilled in the art that the DIA 140 permits multiple communication streams to be time multiplexed across the IPB on a word-by-word basis. For example, the host processing unit can carry on communications with the peripheral unit 175 at the same time that the processor 152 is performing a direct memory access operation with a memory device on the host bus 172. Alternatively, the processor 152 and the peripheral unit 175 can perform direct memory access operations on a host bus memory device.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A system for transferring multiple-bit data words among at least three data units, the bits of any given data word being transferred in parallel, each said data unit having a respective maximum data transfer bandwidth, comprising:
    (a) parallel-bit data bus means for conducting said data words to be transferred among said data units, said parallel-bit data bus means having a predetermined set of data-conducting paths and a data transfer bandwidth at least as great as the sum of the respective bandwidths of the two of said data units having the lowest bandwidths; and
    (b) control means adapted to be coupled to said data units for synchronously controlling access by said data units to said parallel-bit data bus means so as to interleave on the same said set of data-conducting paths said data words transmitted by at least one of said data units with data words transmitted by another of said data units and thereby transmit both said data words at a data transfer rate at least as great as said sum of the respective bandwidths of said two of said data units having the lowest bandwidths.

2. The system of claim 1 wherein said parallel bit data bus means has a predetermined bus structure and at least one of said parallel bit data units comprises means for coupling to said data bus means a data processing device having a bus structure different from said predetermined bus structure.

3. The system of claim 1 wherein at least two of said data units include means for producing a request for access to said parallel-bit data bus means, and said control means includes means for receiving requests for access and grant means for granting said data units access to said parallel-bit data bus means in a predetermined sequence in response to said requests for access.

4. The system of claim 3 wherein said grant means grants access to said parallel bit data bus means without regard to the nature of any previous access grant.

* * * * *